(12) United States Patent
Chen et al.

(10) Patent No.: US 11,379,911 B2
(45) Date of Patent: Jul. 5, 2022

(54) SYSTEM, METHOD, AND APPARATUS FOR SUPPORTING CASH CURRENCY EXCHANGE

(71) Applicant: TENCENT TECHNOLOGY (SHENZHEN) COMPANY LIMITED, Shenzhen (CN)

(72) Inventors: Shengpeng Chen, Shenzhen (CN); Hao He, Shenzhen (CN); Chao Guo, Shenzhen (CN); Huaxiao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/049,264

(22) Filed: Jul. 30, 2018

(65) Prior Publication Data

US 2018/0349987 A1 Dec. 6, 2018

Related U.S. Application Data

(63) Continuation of application No. PCT/CN2017/082126, filed on Apr. 27, 2017.

(30) Foreign Application Priority Data

Apr. 28, 2016 (CN) .............................. 201610280853

(51) Int. Cl.
*G06Q 40/02* (2012.01)
*G06Q 20/38* (2012.01)
(Continued)

(52) U.S. Cl.
CPC .............. *G06Q 40/02* (2013.01); *G06Q 20/10* (2013.01); *G06Q 20/36* (2013.01); *G06Q 20/381* (2013.01);
(Continued)

(58) Field of Classification Search
CPC .... G06Q 40/00; G06Q 30/0641; G06Q 40/02; G06Q 40/04; H04L 67/18; H04L 67/26; H04L 67/32
(Continued)

(56) References Cited

U.S. PATENT DOCUMENTS

2012/0123924 A1* 5/2012 Rose ................... G06Q 20/3274
705/35
2012/0223134 A1* 9/2012 Smith ................. G06Q 20/3223
235/379

(Continued)

FOREIGN PATENT DOCUMENTS

CN 103034958 A 4/2013
CN 103745346 A 4/2014
(Continued)

OTHER PUBLICATIONS

The World Intellectual Property Organization (WIPO) International Search Report for PCT/CN2017/082126 dated Jul. 18, 2017 5 Pages (including translation).
(Continued)

*Primary Examiner* — Christopher Bridges
*Assistant Examiner* — Timothy T. Hsieh
(74) *Attorney, Agent, or Firm* — Anova Law Group, PLLC

(57) ABSTRACT

A system is provided for supporting cash currency exchange. The system included a server, a first client requesting cash-currency-exchange service, and at least one second client providing the cash-currency-exchange service. The first client sends an exchange-service request of cash currency to the server. The server receives the exchange-service request, obtains the at least one second client, and pushes an exchange-service item corresponding to the exchange-service request to the at least one second client.

(Continued)

The second client receives the exchange-service item, and sends a confirmation response to the server. The server pushes information about the at least one second client sending the confirmation response to the first client; and the first client displays the obtained information about the second client, determines a second client as a target client, and triggers an eWallet of the first client to transfer a specified amount to an eWallet of the target client.

18 Claims, 17 Drawing Sheets

(51) Int. Cl.
*G06Q 20/10* (2012.01)
*G06Q 20/36* (2012.01)
*G06Q 30/06* (2012.01)
*G06Q 40/04* (2012.01)
*H04L 67/52* (2022.01)
*H04L 67/55* (2022.01)
*H04L 67/60* (2022.01)

(52) U.S. Cl.
CPC ......... *G06Q 30/0641* (2013.01); *G06Q 40/04* (2013.01); *H04L 67/18* (2013.01); *H04L 67/26* (2013.01); *H04L 67/32* (2013.01)

(58) Field of Classification Search
USPC .......................................................... 705/35
See application file for complete search history.

(56) References Cited

U.S. PATENT DOCUMENTS

| | | | |
|---|---|---|---|
| 2013/0031009 A1 | 1/2013 | Kapoor et al. | |
| 2014/0324689 A1 | 10/2014 | Pinault | |
| 2015/0170186 A1* | 6/2015 | Moreira Neto | G06Q 30/0226 705/14.3 |
| 2015/0310476 A1* | 10/2015 | Gadwa | G06Q 30/0226 705/14.27 |
| 2015/0339638 A1 | 11/2015 | Deluca | |
| 2016/0012465 A1* | 1/2016 | Sharp | G06Q 20/10 705/14.17 |
| 2016/0035215 A1* | 2/2016 | Obaidi | G08B 27/006 340/286.02 |
| 2016/0104133 A1* | 4/2016 | Davis | G06Q 20/10 705/39 |
| 2017/0098221 A1* | 4/2017 | Rai | G06Q 30/018 |

FOREIGN PATENT DOCUMENTS

| | | | | |
|---|---|---|---|---|
| CN | 103782317 A | 5/2014 | | |
| CN | 104123667 A | 10/2014 | | |
| CN | 105096474 A | 11/2015 | | |
| CN | 105872070 A | 8/2016 | | |
| WO | 2015029064 A2 | 3/2015 | | |
| WO | WO-2015139520 A1 * | 9/2015 | ........... | H04L 51/046 |

OTHER PUBLICATIONS

The State Intellectual Property Office of the People's Republic of China (SIPO) Office Action 1 for 201610280853.4 dated Jul. 31, 2018 14 Pages (including translation).

* cited by examiner

SYSTEM, METHOD, AND APPARATUS FOR SUPPORTING CASH CURRENCY EXCHANGE

RELATED APPLICATIONS

This application is a continuation application of PCT Patent Application No. PCT/CN2017/082126, filed on Apr. 27, 2017, which claims priority to Chinese Patent Application No. 201610280853.4, entitled "SYSTEM, METHOD, AND APPARATUS FOR SUPPORTING CASH CURRENCY EXCHANGE" filed on Apr. 28, 2016, all of which are incorporated by reference in entirety.

FIELD OF TECHNOLOGY

This application relates the field of network application technologies and, in particular, to a system, method, and apparatus for supporting cash currency exchange.

BACKGROUND OF THE DISCLOSURE

In our daily life, because electronic payment is not comprehensively available, cash is still required for transactions in many places. To withdraw cash, a user needs to queue up at a bank counter, or to queue up at an automatic teller machine (ATM).

The disclosed methods and systems are directed to solve one or more problems set forth above and other problems.

SUMMARY

Embodiments of this application provide a system, a method, and an apparatus for supporting cash currency exchange.

According to one aspect, a system for supporting cash currency exchange is provided, the system including a first client requesting a cash currency exchange service, at least one second client providing the cash currency exchange service, and a server. The first client is configured to provide an exchange request interface, and to send an exchange-service request of cash currency to the server according to an exchange request operation that is triggered on the exchange request interface, the exchange-service request carrying at least current geographical location information of the first client. The server is configured to receive the exchange-service request, to obtain the at least one second client in a preset range according to at least the current geographical location information of the first client, and to push an exchange-service item corresponding to the exchange-service request to the at least one second client. The second client is configured to receive the exchange-service item, and to send a confirmation response of the exchange-service item to the server according to a confirmation operation that is triggered based on a confirmation control of the exchange-service item. The server is further configured to push information about the at least one second client to the first client from a plurality of second clients sending the confirmation response, the information about the second client comprising at least current geographical location information of the second client. The first client is further configured to display the obtained information about the second client, to determine a second client as a target client from the displayed information about the second client, and to trigger an eWallet of the first client to transfer a specified amount to an eWallet of the target client.

According to another aspect, a method for supporting cash currency exchange is provided, applied to a first client requesting a cash currency exchange service in a system for supporting cash currency exchange, the system further including at least one second client providing the cash currency exchange service and a server. The method includes providing an exchange request interface; and sending an exchange-service request of cash currency to the server according to an exchange request operation that is triggered on the exchange request interface. The exchange-service request is used to trigger the server to obtain the at least one second client in a preset range from the first client according to at least current geographical location information of the first client; to push an exchange-service item corresponding to the exchange-service request to the at least one second client, the exchange-service item being used to trigger the second client to send a confirmation response of the exchange-service item to the server according to a confirmation operation that is triggered based on a confirmation control of the exchange-service item, and to push information about the at least one second client to the first client from a plurality of second clients sending the confirmation response. The method also includes displaying the obtained information about the at least one second client; determining a second client as a target client from the at least one second client; and triggering an eWallet of the first client to transfer a specified amount to an eWallet of the target client.

According to another aspect, an apparatus for supporting cash currency exchange is provided, applied to a first client requesting a cash currency exchange service in a system for supporting cash currency exchange. The system further includes at least one second client providing the cash currency exchange service and a server. The processor is configured to perform: providing an exchange request interface; and sending an exchange-service request of cash currency to the server according to an exchange request operation that is triggered on the exchange request interface. The exchange-service request is used to trigger the server to obtain the at least one second client in a preset range from the first client according to at least current geographical location information of the first client; to push an exchange-service item corresponding to the exchange-service request to the at least one second client, the exchange-service item being used to trigger the second client to send a confirmation response of the exchange-service item to the server according to a confirmation operation that is triggered based on a confirmation control of the exchange-service item, and to push information about the at least one second client to the first client from a plurality of second clients sending the confirmation response. The processor is also configured to perform: displaying the obtained information about the at least one second client; determining a second client as a target client from the at least one second client; and triggering an eWallet of the first client to transfer a specified amount to an eWallet of the target client.

According to another aspect, a non-transitory computer-readable storage medium is provided, applied to a first client requesting a cash currency exchange service in a system for supporting cash currency exchange. The system further includes at least one second client providing the cash currency exchange service and a server. The storage medium stores computer program instructions executable by at least one processor. The computer program instructions can cause the at least one processor to perform: providing an exchange request interface; and sending an exchange-service request of cash currency to the server according to an exchange request operation that is triggered on the exchange request interface. The exchange-service request is used to trigger the server to obtain the at least one second client in a preset range from the first client according to at least current geographical location information of the first client; to push an exchange-service item corresponding to the exchange-service request to the at least one second client, the exchange-service item being used to trigger the second client to send a confirmation response of the exchange-service item to the server according to a confirmation operation that is triggered based on a confirmation control of the exchange-service item, and to push information about the at least one second client to the first client from a plurality of second clients sending the confirmation response. The computer program instructions also cause the at least one processor to perform: displaying the obtained information about the at least one second client; determining a second client as a target client from the at least one second client; and triggering an eWallet of the first client to transfer a specified amount to an eWallet of the target client.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the implementations of the present disclosure in detail with reference to the accompanying drawings.

Figure 1:
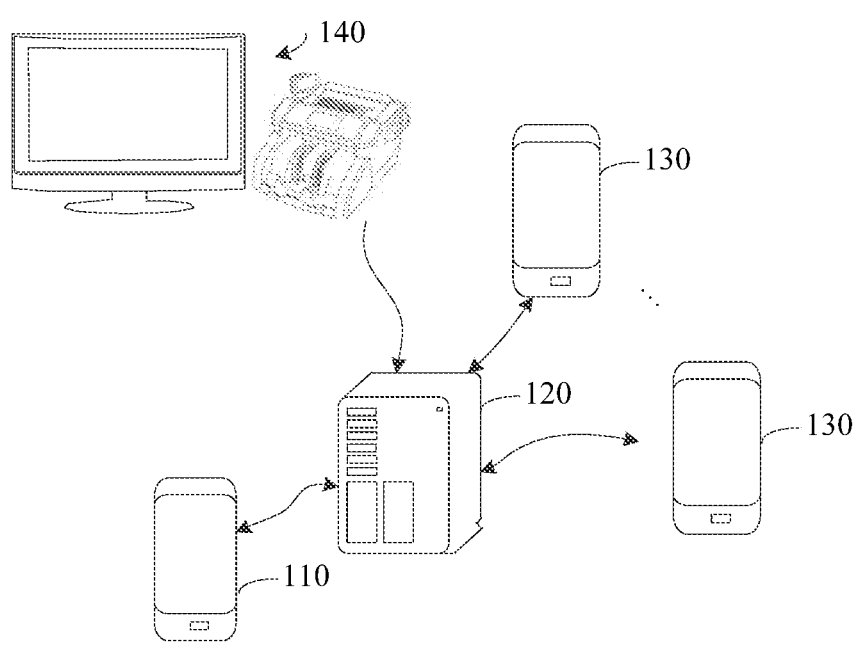
FIG. 1 is an architectural diagram of a system for supporting cash currency exchange according to an embodiment of the present disclosure.

FIG. 1 is an architectural diagram of a system for supporting cash currency exchange according to an embodiment of the present disclosure. The system includes a first client 110 requesting a cash currency exchange service, a server 120, and at least one second client 130 providing the cash currency exchange service.

The first client 110 is an application (APP for short) provided by the server 120. The first client 110 may be a Weibo client, a Blog client, a social-network application client, or other application client. The first client 110 may obtain a service page related to a cash currency exchange service from the server 120, and may further provide information related to the cash currency exchange service for the server 120. Usually, the first client 110 needs to run on a mobile terminal used by a user. The mobile terminal herein may be a smartphone, a tablet computer, an e-reader, or the like.

The first client 110 is connected to the server 120 by using a wired network or a wireless network.

The server 120 is a server computer system that provides the cash currency exchange service. Usually, the server 120 is a cluster of a plurality of servers, each server being configured to implement one or more functional modules. The server 120 may be a cluster of backend server systems that provide the cash currency exchange service. The backend server system that provides the cash currency exchange service may be a backend server system of the Weibo client, a backend server system of an instant chat program, a backend server system of a voice chat program, or a backend server system of a social-network application.

The second client 130 is also an APP provided by the server 120. The second client 130 may be a Weibo client, a Blog client, a social-network application client, or another application client. The second client 130 may obtain the service page related to the cash currency exchange service from the server 120, and may further provide the information related to the cash currency exchange service for the server 120. Usually, the second client 130 needs to run on the mobile terminal used by the user. The mobile terminal herein may be a smartphone, a tablet computer, an e-reader, or the like.

The second client 130 is connected to the server 120 by using the wired network or the wireless network.

Usually, there are more second clients 130 in a cash currency exchange system. Each second client 130 may serve as an ATM that provides cash currency exchange, so that a first client 110 exchanges the cash currency.

Optionally, the system may further include an intermediate merchant client 140. The intermediate merchant client 140 usually has a function of verifying authenticity of the cash currency, and may be, for example, a common currency detector.

Figure 2:
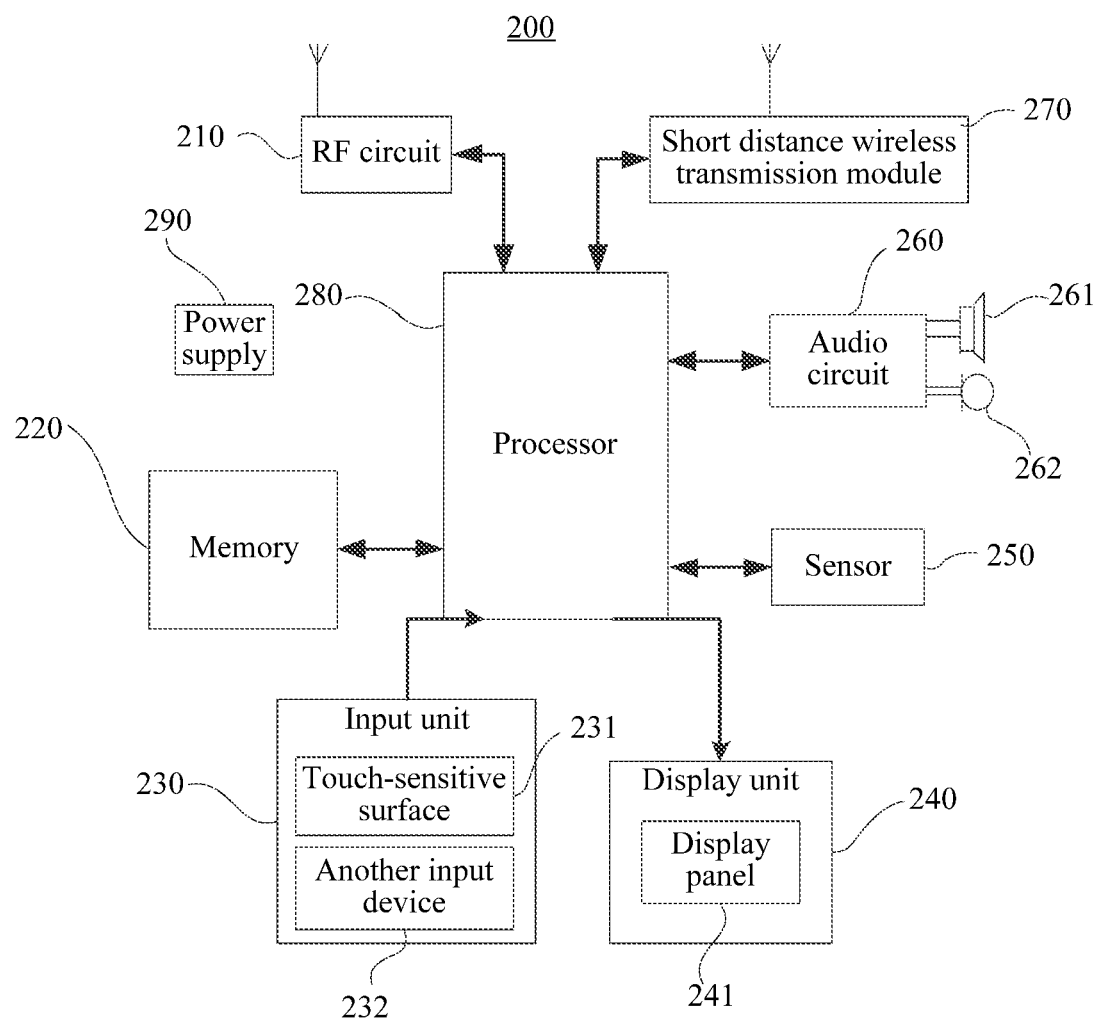
FIG. 2 is a schematic structural diagram of a mobile terminal according to an embodiment of the present disclosure.

FIG. 2 is a schematic structural diagram of a mobile terminal according to an embodiment of the present disclosure. A mobile terminal 200 in FIG. 2 may be a structure of a terminal corresponding to the first client 110 in FIG. 1, or may be a structure of a terminal corresponding to the second client 130 in FIG. 1.

The mobile terminal 200 may include components such as a radio frequency (RF) circuit 210, a memory 220 including one or more computer readable storage media, an input unit 230, a display unit 240, a sensor 250, an audio circuit 260, a short distance wireless transmission module 270, a processor 280 including one or more processing cores, and a power supply 290. A person skilled in the art may understand that the structure of the mobile terminal 200 shown in FIG. 2 does not constitute a limitation to the mobile terminal, and the mobile terminal may include more or fewer components than those shown in the figure, or some components may be combined, or a different component deployment may be used.

The RF circuit 210 may be configured to receive and send signals during an information receiving and sending process or a call process. Particularly, the RF circuit receives downlink information from a base station, then delivers the downlink information to one or more processors 280 for processing, and sends related uplink data to the base station. Generally, the RF circuit 210 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 210 may also communicate with a network and another device by wireless communication. The wireless communication may use any communications standard or protocol, which includes, but is not limited to, global system for mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 220 may be configured to store a software program and module. For example, the memory 220 may be configured to store a preset time list, may further be configured to store a software program for collecting a voice signal, a software program for implementing key word recognition, a software program for implementing consecutive voice recognition, and a software program for implementing reminders setting, and may further be configured to store a binding relationship between a wireless access point and a user account, and the like. The processor 280 runs the software program and module stored in the memory 220, to implement various functional applications and data processing. The memory 220 may mainly include a program storage area and a data storage area. The program storage area may store an operating system, an application program required by at least one function (such as a sound playback function, an image display function, or a touch screen recognition function), and the like. The data storage area may store data created according to use of the mobile terminal, and the like. In addition, the memory 220 may include a high speed random access memory, and may also include a non-volatile memory, such as at least one magnetic disk storage device, a flash memory, or another volatile solid-state storage device. Correspondingly, the memory 220 may further include a memory controller, so as to provide access of the processor 280 and the input unit 230 to the memory 220.

The input unit 230 may be configured to receive input digit or character information, and generate a keyboard, mouse, joystick, optical, or track ball signal input related to the user setting and function control. Specifically, the input unit 230 may include a touch-sensitive surface 231 and another input device 232. The touch-sensitive surface 231, also referred to as a touchscreen or a touch panel, may collect a touch operation of a user on or near the touch-sensitive surface (such as an operation of a user on or near the touch-sensitive surface 231 by using any suitable object or accessory, such as a finger or a stylus), and drive a corresponding connection apparatus according to a preset program. Optionally, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 280. Moreover, the touch controller can receive and execute a command sent from the processor 280. In addition, the touch-sensitive surface 231 may be a resistive, capacitive, infrared, or surface sound wave type touch-sensitive surface. In addition to the touch-sensitive surface 231, the input unit 230 may further include the other input device 232. Specifically, the other input device 232 may include, but is not limited to, one or more of a physical keyboard, a functional key (such as a volume control key or a switch key), a track ball, a mouse, and a joystick.

The display unit 240 may be configured to display information input by the user or information provided for the user, and various graphical user interfaces of the mobile terminal. The graphical user interfaces may be formed by a graph, a text, an icon, a video, or any combination thereof. The display unit 240 may include a display panel 241. Optionally, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 231 transfers the touch operation to the processor 280, so as to determine a type of a touch event. Then, the processor 280 provides corresponding visual output on the display panel 241 according to the type of the touch event. Although, in FIG. 2, the touch-sensitive surface 231 and the display panel 241 are used as two separate parts to implement input and output functions, in some embodiments, the touch-sensitive surface 231 and the display panel 241 may be integrated to implement the input and output functions.

The mobile terminal may further include at least one sensor 250, such as an optical sensor, a motion sensor, and other sensors. Specifically, the optical sensor may include an ambient light sensor and a proximity sensor. The ambient light sensor can adjust luminance of the display panel 241 according to brightness of the ambient light. The proximity sensor may switch off the display panel 241 and/or backlight when the mobile terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile terminal, are not described herein again.

The audio circuit 260, a speaker 261, and a microphone 262 may provide audio interfaces between the user and the mobile terminal. The audio circuit 260 may convert received audio data into an electric signal and transmit the electric signal to the speaker 261. The speaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to another mobile terminal by using the RF circuit 210, or outputs the audio data to the memory 220 for further processing. The audio circuit 260 may further include an earphone jack, so as to provide communication between a peripheral earphone and the mobile terminal.

The short distance wireless transmission module 270 may be a wireless fidelity (WIFI) module, a Bluetooth module, or the like. The mobile terminal may help, by using the short distance wireless transmission module 270, the user to receive and send e-mails, browse a web page, access streaming media, and the like, which provides wireless broadband Internet access for the user. Although FIG. 2 shows the short distance wireless transmission module 270, it may be understood that the short distance wireless transmission module 270 is not a necessary component of the mobile terminal, and when required, the short distance wireless transmission module 270 may be omitted as long as the scope of the essence of the present disclosure is not changed.

The processor 280 is a control center of the mobile terminal, and connects to various parts of the mobile terminal by using various interfaces and lines. By running or executing the software program and/or module stored in the memory 220, and invoking data stored in the memory 220, the processor 280 performs various functions and data processing of the mobile terminal, thereby performing overall monitoring on the mobile terminal. Optionally, the processor 280 may include one or more processor cores. Optionally, the processor 280 may integrate an application processor and a modem. The application processor mainly processes an operating system, a user interface, an application program, and the like. The modem mainly processes wireless communication. It may be understood that the foregoing modem may also not be integrated into the processor 280.

The mobile terminal further includes the power supply 290 (such as a battery) for supplying power to the components. Preferably, the power supply may be logically connected to the processor 280 by using a power management system, thereby implementing functions such as charging, discharging and power consumption management by using the power management system. The power supply 290 may further include one or more of a direct current or alternating current power supply, a re-charging system, a power failure detection circuit, a power supply converter or inverter, a power supply state indicator, and any other components.

Although not shown in FIG. 2, the mobile terminal may further include a camera, a Bluetooth module, and the like, which are not further described herein.

The mobile terminal further includes a memory and one or more programs. The one or more programs are stored in the memory and configured to be executed by one or more processors.

Figure 3:
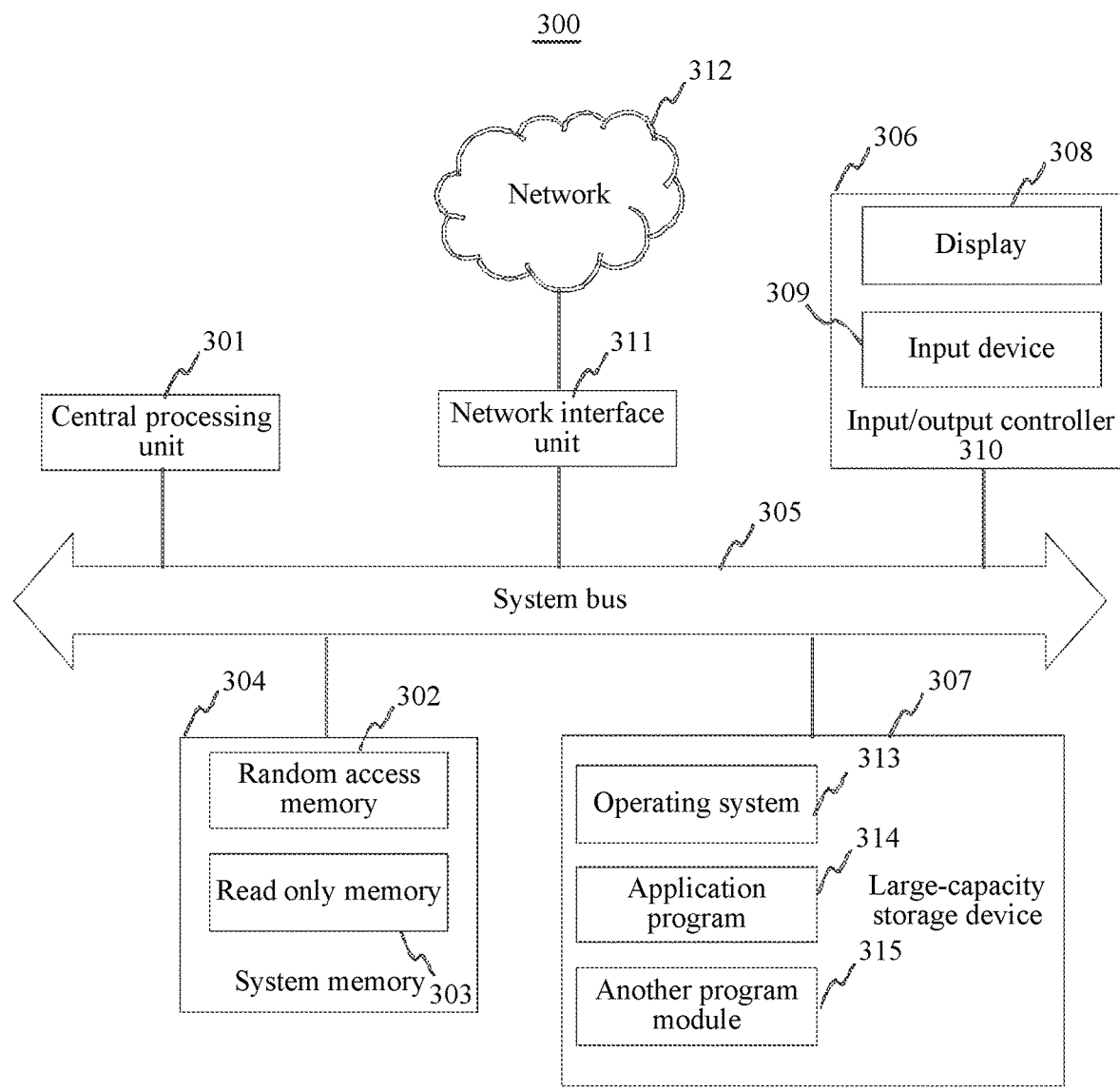
FIG. 3 is a schematic structural diagram of a server according to an embodiment of the present disclosure.

FIG. 3 is a schematic structural diagram of a server according to an embodiment of the present disclosure. A server 300 is the server 120 in the system in FIG. 1.

The server 300 includes a central processing unit (CPU) 301, a system memory 304 including a random access memory (RAM) 302 and a read only memory (ROM) 303, and a system bus 305 connecting the system memory 304 and the CPU 301. The server 300 further includes a basic input/output (I/O) system 306 assisting in transmitting information between devices in a computer, and a large-capacity storage device 307 configured to store an operating system 313, an application program 314, and another program module 315.

The basic I/O system 306 includes a display 308 configured to display information and an input device 309, such as a mouse or a keyboard, configured to input information for a user. The display 308 and the input device 309 are both connected to the CPU 301 by using an I/O controller 310 connected to the system bus 305. The basic I/O system 306 may further include the I/O controller 310 to be configured to receive and process inputs from multiple other devices such as a keyboard, a mouse, and an electronic stylus. Similarly, the I/O controller 310 further provides an output to a display screen, a printer, or another type of output device.

The large-capacity storage device 307 is connected to the CPU 301 by using a large-capacity storage controller (not shown) connected to the system bus 305. The large-capacity storage device 307 and its associated computer readable medium provide non-volatile storage for the server 300. That is to say, the large-capacity storage device 307 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a static random access memory (SRAM), an electrically erasable programmable read-only memory (EEPROM), an erasable programmable read only memory (EPROM), a programmable read only memory (PROM), a RAM, a ROM, a flash memory or other solid-state memory technologies; a CD-ROM, a digital versatile disc (DVD), or other optical storages; and a cassette, a magnetic tape, a disk storage or other magnetic storage devices. Certainly, persons skilled in art can know that the computer storage medium is not limited to the foregoing several types. The system memory 304 and the large-capacity storage device 307 may be collectively referred to as a memory.

According to various embodiments of the present disclosure, the server 300 may further be connected, by using a network such as the Internet, to a remote computer on the network and run. That is, the server 300 may be connected to a network 312 by using a network interface unit 311 connected to the system bus 305, or may also be connected to another type of network or remote computer system (not shown) by using the network interface unit 311.

The foregoing memory 304 further includes one or more programs. The programs are configured to be executed by one or more processors.

To push to a first client information about a second client that may provide a cash currency exchange service and that is relatively close to the first client, a server needs to screen second clients first.

Further, the first client 110 is configured to provide an exchange request interface, and send an exchange-service request of cash currency to the server 120 according to an exchange request operation that is triggered on the exchange request interface, the exchange-service request carrying at least the current geographical location information of the first client 110.

The server 120 is configured to receive the exchange-service request, obtain the at least one second client 130 in a preset range according to at least the current geographical location information of the first client 110, and push an exchange-service item corresponding to the exchange-service request to the at least one second client 130.

The second client 130 is configured to receive the exchange-service item, and send a confirmation response of the exchange-service item to the server 120 according to a confirmation operation that is triggered based on a confirmation control of the exchange-service item.

The server 120 is further configured to push information about the at least one second client 130 to the first client 110 from a plurality of second clients 130 that send the confirmation response, the information about the second client 130 including at least current geographical location information of the second client 130.

The first client 110 is further configured to display the received information about the second client 130, to determine a second client 130 as a target client from the displayed information about the second client 130, and to trigger an eWallet of the first client 110 to transfer a specified amount to an eWallet of the target client.

The specified amount transferred by the eWallet of the first client 110 is used to exchange for cash currency equal to the specified amount that is held by a user of the target client.

In view of the above, according to the system for supporting cash currency exchange provided in one embodiment of the present disclosure, by using the server to search, for the first client requesting the cash currency exchange service, at least one second client providing the cash currency exchange service, the eWallet of the first client is triggered to transfer the specified amount to the eWallet of the second client. Further, a user of the first client withdraws the cash currency equal to the specified amount from a user or a merchant of the second client. The second clients in the network have relatively more users, and the second client recommended to the first client by the server is relatively close to the first client. Therefore, the following situation in the prior art is improved: a cash withdraw process is much time-consuming due to that people need to withdraw cash in a relatively long distance when withdrawing the cash at a bank or an ATM because banks or ATMs are sparsely distributed, thereby achieving a quick cash withdrawal.

The first client usually displays an exchange request webpage, and uses the exchange request webpage to guide the user to set a defining condition for the second client that provides cash currency service, so as to request the cash-currency-exchange service. In a schematic embodiment:

The first client 110 is further configured to display an exchange request webpage provided with the exchange request interface, the exchange request webpage including the defining condition for defining the second client 130 that provides the cash-currency-exchange service.

Optionally, the defining condition described herein may include a client type for defining the second client 130. The client type may include, for example, a merchant and an individual.

When the defined client type is selected to be an individual, the defining condition may further include at least one of interest, gender, and age. For example, when the cash currency is exchanged between the first client 110 and the target client (a second client), because the interests, the gender, and the age of the target client meet a friend-making condition of the first client 110, the first client 110 is more likely to make friends with the target client, thereby providing possibility of social interaction.

When the defined client type is selected to be a merchant, the defining condition may further include service types of the merchant, such as catering, household, and cleaning.

It should be noted that after the user selects the defined client type in the exchange request webpage, a condition setting option corresponding to a non-selected client type is set to be inoperable. For example, when the user selects the individual type, condition setting options such as a service type related to the merchant type in the exchange request webpage are all set to be inoperable. Further for example, when the user selects the merchant type, condition setting options such as interests, gender, and age related to the individual type in the exchange request webpage are all set to be inoperable.

Optionally, the defining condition may further include a set distance. The distance is used to indicate a largest distance that is allowed between the second client 130 and the first client 110. After the first client 110 defines the distance, distances between the second clients 130 and the first client 110 that are finally recommended by the server 120 for the first client 110 are all smaller than the distance, so that exchange of the cash currency becomes quicker.

Optionally, the defining condition may further include a maximum amount for exchanging. Definition of the amount may avoid a situation in which some second clients 130 that provide the cash-currency-exchange service in small amounts participate in the cash currency exchange, but cannot provide entire cash currency for the first client 110. In addition, the definition of the amount may further prevent some second clients 130 that only provide cash-currency-exchange service in large amounts from participating in the cash currency exchange. Therefore, the second client 130 can make a choice when participating in the cash currency exchange.

Apparently, the defining condition may further include other conditions, and the specific content of the defining condition is not limited in any embodiment.

The first client 110 is further configured to obtain the defining condition set in the exchange request webpage, generate the defining condition and the current geographical location information of the first client 110 into the exchange-service request according to the exchange requirement operation that is triggered on the exchange request interface, and send the exchange-service request to the server 120.

After the exchange request interface is triggered, the first client 110 generates the defining condition set in the exchange request webpage and the current geographical location information of the first client 110 into the exchange-service request, and sends the exchange-service request to the server 120.

Optionally, the first client 110 may further respectively display different exchange request webpages for the merchant type and the individual type. In such case, a condition setting option in a first exchange request webpage for the merchant type only relates to an option related to the merchant type; and a condition setting option in a second exchange request webpage for the individual type only relates to an option related to the individual type.

Correspondingly, when an exchange request interface in the first exchange request webpage is triggered, the first client 110 generates a condition defined in the first exchange request webpage and the current geographical location information of the first client 110 into an exchange-service request and sends the exchange-service request to the server 120. When an exchange request interface in the second exchange request webpage is triggered, the first client 110 generates a condition defined in the second exchange request webpage and the current geographical location information of the first client 110 into an exchange-service request and sends the exchange-service request to the server 120.

Optionally, the first client 110 may obtain an exchange service home page from the server 120. A merchant exchange interface and an individual exchange interface are displayed on the exchange service home page. The first exchange request webpage is displayed after the merchant exchange interface is triggered, and the second exchange request webpage is displayed after the individual exchange interface is triggered. Apparently, when the user does not need to set the defining condition, the first client 110 directly generates the exchange-service request by using the current geographical location information of the first client 110 after triggering the merchant exchange interface or the individual exchange interface, and sends the exchange-service request to the server 120.

Figure 4A:
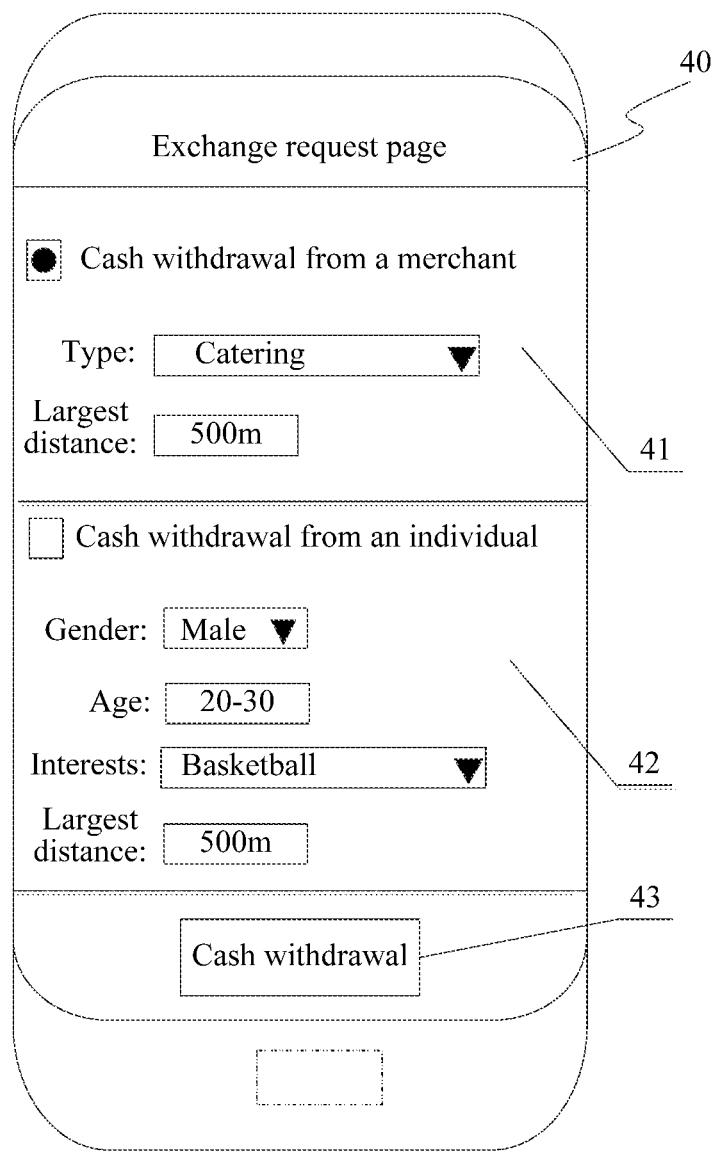
FIG. 4A to FIG. 4C are schematic diagrams when a system for supporting cash currency exchange is implemented according to some embodiments of the present disclosure.

FIG. 4A is a schematic diagram of an exchange request webpage according to an embodiment of the present disclosure. Refer to FIG. 4A, an exchange request webpage 40 includes a condition setting option, and is divided into a condition setting option 41 in a merchant type and a condition setting option 42 in an individual type. The condition setting option 41 includes a type and a maximum distance. The condition setting option 42 includes gender, age, interests, and a maximum distance. Optionally, only one or both of the condition setting option 41 and the condition setting option 42 may be selected. For example, only the condition setting option 41 in the merchant type may be selected, or only the condition setting option 42 in the individual type may be selected. Further for example, the condition setting option 41 in the merchant type and the condition setting option 42 in the individual type may be selected at the same time. In FIG. 4A, after an exchange request interface 43 is triggered, an exchange-service request may be generated according to a defining condition that is entered by the exchange request webpage 40 and that is defined by the selected condition setting option, and the current geographical location information of the first client.

Optionally, when the first client 110 receives information about the second client 130 sent by the server 120, to help a user of the first client 110 to view the distance to each second client 130, so as to confirm a final target client, the first client 110 may further obtain the current geographical location information of the second client 130 that is carried in the information about the second client 130, calculate a distance between the first client 110 and the second client 130, and bind and display the information about the second client 130 and a distance to the corresponding second client 130. Alternatively, the information about the second client 130 further includes the distance between the first client 110 and the second client, and the first client 110 binds and displays the information about the second client 130 and the distance between the first client 110 and the second client 130.

Figure 4B:
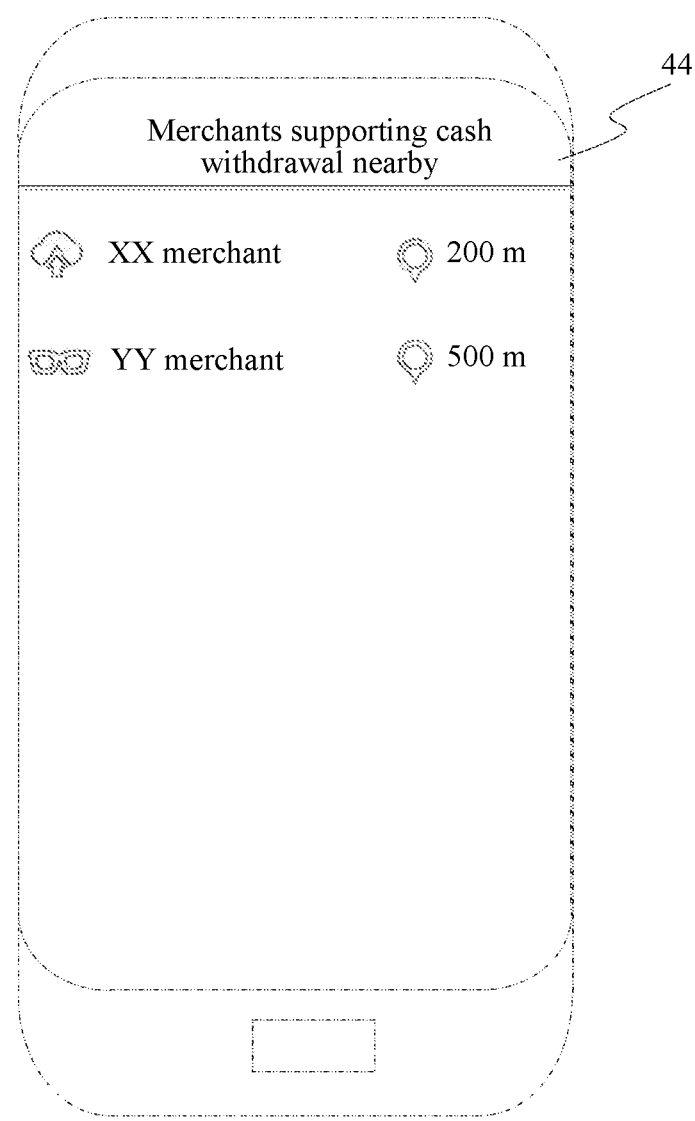

FIG. 4B is a schematic diagram of an interface displaying a list of information about the second client according to an embodiment of the present disclosure. In an interface 44 of FIG. 4B, information about the second client "XX merchant" and a corresponding distance "200 meters" are displayed, and information about the second client "YY merchant" and a corresponding distance "500 meters" are also displayed.

Accordingly, the first client may set a defining condition to enable the server to recommend only a second client(s) that meets the foregoing defining condition when recommending a second client for the first client, so as to satisfy actual requirements of the first client.

After receiving the exchange-service request sent by the first client, the server may screen the second clients for a first time according to the defining condition set by the first client and a current geographical location of the first client, generate the exchange-service item corresponding to the exchange-service request, and send the exchange-service item to the screened second client. In this way, only the second client that meets the defining condition and that is relatively close to the first client is qualified to perform order preemption on the exchange-service item.

The server 120 is further configured to obtain, according to the current geographical location information of the first client 110, at least one second client 130 that is in the preset range and that meets the defining condition, and push the exchange-service item corresponding to the exchange-service request to the at least one second client 130.

The server 120 pre-stores most recent geographical location information of the second client 130. Optionally, the second client 130 may also report the most recent geographical location information thereof to the server 120 in real time.

There are a lot of second clients 130, and some second clients 130 are much far away from the first client 110. These second clients 130 that are much far away need to walk for a relatively long distance for exchanging the cash currency. Therefore, it is not suggested to recommend these second clients 130 to the first client 110. Considering this situation, the server 120 first parses out a current geographical location of the first client 110 from the exchange-service request, subsequently obtains, according to the current geographical location information of the first client 110, the at least one second client 130 that is in the preset range and that meets the defining condition, and then screens the second clients 130 that meet the defining condition carried in the exchange-service request from these second clients 130.

Optionally, the exchange-service request may not include the current geographical location information of the first client 110. However, the server 120 stores the most recent geographical location information of the first client 110, and the geographical location information usually is reported to the server 120 by the first client in real time. Therefore, the most recent geographical location information of the first client 110 that is stored in the server 120 usually may also represent the current geographical location of the first client 110.

Accordingly, the server screens a second client that meets the defining condition and that is relatively close to the first client according to the exchange-service request sent by the first client, so that the second client that meets the defining condition and that is relatively close to the first client is qualified to perform order preemption on the requested exchange service.

If the second client wants to accept an order after receiving the exchange-service item pushed by the server, the second client may perform the order preemption, and the server makes a recommendation to the first client according to the second client that performs the order preemption.

Specifically, the second client 130 receives the exchange-service item sent by the server 120, and displays the exchange-service item. Usually, the exchange-service item displayed on the second client 130 may include a confirmation control configured to perform order preemption. The second client 130 sends the confirmation response of the exchange-service item to the server 120 according to the confirmation operation that is triggered based on the confirmation control of the exchange-service item. That is, the second client 130 performs order preemption on the exchange-service item, and this means that the second client 130 wants to provide cash-currency-exchange service for the first client 110.

The server 120 may determine, after receiving the confirmation response fed back by the second clients 130, a second client 130 that meets a push condition from the second clients 130 that feed back the confirmation response, and push the information about the second client 130 that meets the push condition to the first client 110.

In a possible implementation, the server 120 has more second clients 130 that send a service exchange item, and the number of the second clients 130 that feed back the confirmation response is not defined. Therefore, the server 120 may receive confirmation responses fed back by relatively more second clients 130, that is, there may be multiple second clients 130 that perform order preemption. In this case, the server 120 may push all or some of these second clients 130 to the first client 110.

Optionally, the second client 130 that meets the push condition is a first second client 130 that feeds back the confirmation response, or all second clients 130 that feed back the confirmation response, or one or more second clients 130 that feed back the confirmation response and that are closest to the first client 110, or a predetermined number of second clients 130 that feed back the confirmation response and that have the highest service levels.

In a possible implementation scenario, the server 120 directly obtains the at least one second client 130 in the preset range according to the current geographical location information of the first client 110 after receiving the exchange-service request that is sent by the first client and that carries the defining condition, and pushes the exchange-service item of the exchange-service request to these second clients 130. Therefore, the server 120 may further push the second client 130 that feeds back the confirmation response and that meets the defining condition to the first client 110, after receiving the confirmation response fed back by the second client 130. That is, the second client 130 that meets the push condition may alternatively be the second client 130 that feeds back the confirmation response and that meets the defining condition carried in the exchange-service request.

The server 120 may also define the number of the second clients 130 that perform order preemption, and push the second client 130 that successfully performs the order preemption to the first client 110.

Optionally, the server 120 pushes a confirmation end notification to another second client 130 that pushes the exchange-service item, when receiving a predetermined number of confirmation responses fed back regarding the exchange-service item. The predetermined number described herein is at least one.

The second client 130 is further configured to set the displayed confirmation control of the exchange-service item corresponding to the confirmation end notification to be operation-prohibited, after receiving the confirmation end notification.

That is, after the server 120 receives confirmation responses of a defined quantity of order preemption, other second clients 130 may be prohibited to perform order preemption on the exchange-service item.

In this case, the server 120 may directly feed back to the first client 110 at least one second client 130 that feeds back the confirmation response, or may feed back to the first client 110 at least one second client 130 that feeds back the confirmation response and that meets the defining condition.

Accordingly, when making a recommendation to the first client according to the second client that performs the order preemption, the server may further define the second client that is recommended to the first client, so that the second client that is recommended to the first client is more likely to be adopted by the first client, thereby improving a success rate of the recommendation.

The first client selects one second client as the target client for an exchange transaction according to information about the second client recommended by the server. To guide the first client and the second client to transact quicker, a navigation page related to the first client and the second client may further be displayed on the first client. In a schematic embodiment:

In a possible implementation, the first client 110 generates the navigation page locally.

Specifically, after determining the target client, the first client 110 generates the navigation page according to a path between the first client 110 and the target client, and displays the generated navigation page. The navigation page displays at least real-time location information of the first client 110 and real-time location information of the target client.

Optionally, the first client 110 may obtain the real-time location information of the target client from the server 120 in real time.

In another possible implementation, when the second client 130 is a merchant client, the server 120 generates a navigation page related to geographical locations of the first client 110 and the second client 130, and pushes the generated navigation page to at least one of the first client 110 and the second client 130.

Specifically, the first client 110 is further configured to send information about the target client to the server 120 after determining the target client.

The server 120 generates the navigation page according to the path between the first client 110 and the target client after receiving the information about the target client that is selected by the first client 110 and when the target client is a merchant client, and pushes the navigation page to at least one of the first client 110 and the target client.

The first client 110 displays the navigation page after receiving the navigation page pushed by the server 120.

The target client displays the navigation page after receiving the navigation page pushed by the server 120.

The displayed navigation page displays at least the real-time location information of the first client 110 and real-time location information of the second client 130.

In another possible implementation, the server 120 determines an intermediate merchant client that is closest to the first client 110 when the target client is a user client, and pushes the intermediate merchant client to the first client 110 and the target client. Navigation pages navigated to the intermediate merchant client are respectively generated by the first client and the target client.

Specifically, the server 120 is further configured to determine the intermediate merchant client whose location is closest to a location at which the first client 110 is located after receiving the information about the target client that is selected by the first client and when the target client is the user client, and push location information of the intermediate merchant client to the first client 110 and the selected target client.

In actual applications, counterfeit currency may exist in the cash currency. Therefore, to ensure security of cash currency transaction, when the target client is the user client, to avoid a situation in which users of the first client and the target client are not capable of verifying the cash currency, an intermediate merchant client needs to be provided for the first client and the target client. A merchant corresponding to the intermediate merchant client is capable of verifying authenticity of the cash currency, so as to make sure that the intermediate merchant client verifies the authenticity of the cash currency when the cash currency exchange is performed, ensuring security of the cash currency exchange.

The first client 110 generates a navigation page by using a path between the first client 110 and the intermediate merchant client when receiving the location information that is of the intermediate merchant client and that is pushed by the server 120.

The target client generates a navigation page by using a path between the target client and the intermediate merchant client when receiving the location information that is of the intermediate merchant client and that is pushed by the server 120.

The generated navigation page displays the real-time location information of the first client 110, the real-time location information of the second client 130, and the real-time location information of the intermediate merchant client.

In another possible implementation, when the target client is a user client, the server 120 generates a navigation page related to geographical locations of the first client 110, the target client, and an intermediate merchant, and pushes the generated navigation page to the first client 110 and the target client.

Specifically, the server 120 determines an intermediate merchant client whose location is closest to a location at which the first client 110 is located after receiving the information about the target client that is selected by the first client 110 and when the target client is the user client, generates a first navigation page according to the path between the first client 110 and the intermediate merchant client, generates a second navigation page according to the path between the target client and the intermediate merchant client, sends the first navigation page to the first client 110, and sends the second navigation page to the target client, a merchant corresponding to the intermediate merchant client being capable of verifying authenticity of the cash currency.

The first client 110 receives and displays the first navigation page pushed by the server 120.

The target client receives and displays the second navigation page pushed by the server 120.

Optionally, other information related to the cash-currency-exchange service, for example, a transfer portal or a transfer control that triggers the eWallet of the first client 110 to transfer a resource to an eWallet of the second client 130 may be displayed on the navigation page.

Accordingly, after the first client determines the target client, the navigation page may be displayed at the first client or the second client, so as to guide the first client or the second client to definitely arrive at a transaction destination the quickest, and exchange the cash currency.

When the target client is not the merchant client, the navigation page may be displayed at both the first client and the second client, so as to guide the first client and the second client to arrive at the intermediate merchant the quickest, and exchange the cash currency.

When the users of the first client and the second client are located at a same destination, a transaction of obtaining the cash currency in an equal amount by an online payment may be performed. In an exemplary embodiment:

In a possible implementation, the first client may obtain the geographical location of the first client and a geographical location of the target client in real time. When the location or corresponding place of the first client is same to that of the target client, the eWallet of the first client is automatically triggered to transfer the specified amount to the eWallet of the target client.

For example, in the navigation page displayed by the first client, if the locations of the first client and the target client are superposed, the eWallet of the first client is automatically triggered to transfer the specified amount to the eWallet of the target client.

In another possible implementation, the first client displays the transfer control, and triggers, according to a transfer triggering operation that is triggered based on the transfer control, the eWallet of the first client to transfer the specified amount to the eWallet of the target client, when the location of the first client is same to that of the target client.

For example, in the navigation page displayed by the first client, the first client displays the transfer control by using the navigation page or another service page, when the locations of the first client and the target client are superposed. The first client triggers, according to the transfer triggering operation that is triggered based on the transfer control, the eWallet of the first client to transfer the specified amount to the eWallet of the target client, after the transfer control is triggered by the user.

Optionally, the navigation page displays the transfer control when being initially displayed. However, an operation attribute of the transfer control in this case is inoperable, that is, cannot be triggered by the user. The operation attribute of the transfer control is set to be operable until the first client determines that the locations of the first client and the target client are superposed, so as to guide the user to trigger the transfer control.

Accordingly, an amount transfer page of the eWallet is switched to when the first client determines that the first client and the target client are located at a same place, so as to trigger the first client to enable the eWallet of the first client to transfer the specified amount to the eWallet of the target client.

There may be a plurality of transferring manners when transferring the specified amount to the eWallet of the target client by using the eWallet of the first client.

In a first transferring manner, the target client generates a first graphic code related to the information about the target client, and the first client 110 scans the first graphic code.

The first client 110 parses out the information about the target client that is related to the first graphic code after scanning the first graphic code, displays a value transfer interface corresponding to the target client, and obtains an amount that is entered into the value transfer interface and that needs to be transferred. The user enters the transferred specified amount in the amount transfer interface. The first client 110 sends the specified amount entered in the amount transfer interface and the information about the target client to an amount transfer platform, and the amount transfer platform transfers the specified amount from the eWallet of the first client 110 to the eWallet of the target client.

In a second transferring manner, the first client 110 generates a second graphic code related to information about the first client 110, and the second graphic code is provided to the target client for scanning. The target client obtains the information about the first client 110 after scanning the second graphic code. The target client is used to send the information about the first client 110 and the specified amount that needs to be transferred by the first client 110 (may be entered by the target client) to the amount transfer platform. The amount transfer platform transfers the specified amount from the eWallet of the first client 110 to the eWallet of the target client.

In a third transferring manner, the first client 110 displays the amount transfer interface. An amount entering box, an account entering box for receiving an amount transfer, and a confirmation control are provided in the amount transfer interface. The user may enter the specified amount in the value entering box, and enter an account of the eWallet of the target client in the account entering box. The first client 110 sends the specified amount entered in the amount transfer interface and the account of the eWallet of the target client to the amount transfer platform after the confirmation control in the amount transfer interface is triggered. The amount transfer platform transfers the specified amount from the eWallet of the first client to the eWallet of the target client.

The amount transfer platform herein may be a part of the server 120 in the system in FIG. 1, or may be a platform independent from the server 120.

Further, to endure integrity of the cash currency exchange, the specified amount transferred from the eWallet of the first client 110 may be first transferred to a common eWallet of the amount transfer platform. The first client 110 may display a notification page indicating that the value is successfully transferred, after the specified amount is successfully transferred to the common eWallet. After the first client 110 and the target client complete payment of the cash currency in an offline manner, a confirmation control on the notification page is triggered by the user of the first client 110. The first client 110 notifies the amount transfer platform to transfer the specified amount in the common eWallet to the eWallet of the target client, after the confirmation control is triggered. The amount transfer platform feeds back a transfer success notification to the first client 110 after the transfer succeeds.

Accordingly, the first client is triggered to transfer the specified amount to the eWallet of the target client by providing an amount transfer interface for the first client, thereby helping subsequent users of the first client and the target client to perform an offline cash currency delivery.

In actual applications, the second client that provides the cash currency exchange usually is a merchant, and wants to promote products of the merchant more while providing cash-currency-exchange service. Therefore, to promote sales of the own products and enthusiasm of a merchant client in providing the cash currency, the server may push a resource collection item related to the merchant client to the merchant client requesting the cash-currency-exchange service, after the merchant client provides the cash currency service.

The first client 110 displays an amount transfer success page after the eWallet of the first client 110 successfully transfers the specified amount to the eWallet of the target client, and sends an exchange success notification to the server 120 after a confirmation control provided on the amount transfer success page is triggered.

The server 120 obtains, after receiving the exchange success notification sent by the first client 110, a type of the target client that completes transferring of the specified amount, and pushes a first resource collection item for exchanging for an article provided by the target client to the first client 110 when the target client is a merchant client.

Further, a second resource collection item for exchanging for an article provided by a specific merchant is pushed to the first client 110 and the target client when the target client is a user client. The second resource collection item herein may be placed in the server 120 in advance by the specific merchant.

Figure 4C:
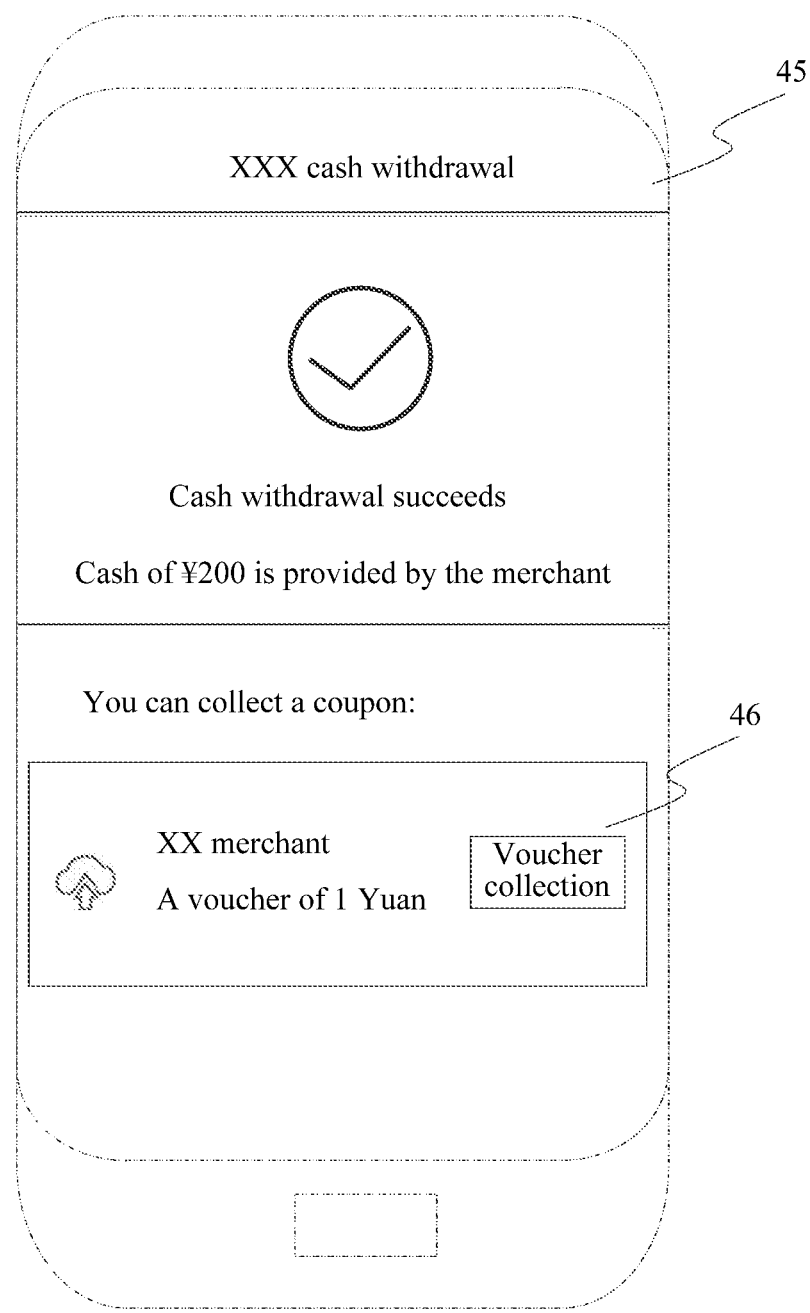

FIG. 4C is a schematic diagram of an interface including a resource collection item according to an embodiment of the present disclosure. In an interface 45 of FIG. 4C, a resource collection item 46 is displayed. The resource collection item is a voucher related to a target client "XX merchant".

Optionally, the server 120 may further improve a service level of the target client after receiving the exchange success notification sent by the first client 110. The service level may serve as a factor to be considered when the server 120 screens, for the first client 110, the second client 130 providing the cash-currency-exchange service. For example, if the service level of the second client 130 is higher, the second client 130 is more likely to be recommended to a neighboring first client 110.

Accordingly, the server pushes, to the first client, a resource collection item related to the target client that provides the cash currency service when the first client completes the cash currency exchange, so as to improve a promotion degree and sales of the target client.

The server provides the resource collection item, as an award, for both the first client and the target client when the first client and the target client serving as the user client complete the cash currency exchange, and may further promote the first client and the target client to use the cash-currency-exchange service.

It should be additionally noted that to prevent the first client from performing illegal cash exchanges such as frequent cash exchanges or cash exchange in large amounts, in one embodiment of the present disclosure, the server needs to determine a cash exchange frequency or a cash exchange amount of the first client after receiving the exchange-service request sent by the first client.

Using the exchange frequency as an example, the server 120 detects whether the number of sending the exchange-service item in a predetermined time period by the first client 110 is smaller than a predetermined threshold, after receiving the exchange-service request sent by the first client 110; and the step of obtaining the at least one second client 130 in the preset range according to at least the current geographical location information of the first client 110 is performed if the number of sending the exchange-service item in the predetermined time period by the first client 110 is smaller than the predetermined threshold.

Using the exchange amount as an example, the server 120 detects whether a total value successfully transferred in a predetermined time period by the first client 110 is smaller than a predetermined threshold, after receiving the exchange-service request sent by the first client 110; and the step of obtaining the at least one second client 130 in the preset range according to at least the current geographical location information of the first client 110 is performed if the total value successfully transferred in the predetermined time period by the first client 110 is smaller than the predetermined threshold.

Figure 5A:
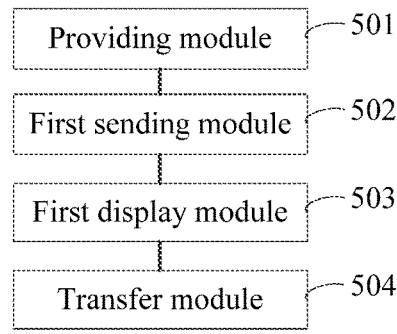
FIG. 5A is a structural block diagram of a first client according to an embodiment of the present disclosure.

FIG. 5A is a structural block diagram of a first client according to an embodiment of the present disclosure. The first client includes a providing module 501, a first sending module 502, a first display module 503, and a transfer module 504.

The providing module 501 is configured to provide an exchange request interface.

The first sending module 502 is configured to send an exchange-service request of cash currency to a server according to an exchange request operation that is triggered on the exchange request interface provided by the providing module 501, the exchange-service request being used to trigger the server to obtain at least one second client in a preset range according to at least current geographical location information of the first client, and push an exchange-service item corresponding to the exchange-service request to the at least one second client, the exchange-service item being used to trigger the second client to send a confirmation response of the exchange-service item to the server according to a confirmation operation that is triggered based on a confirmation control of the exchange-service item, and the server pushing information about the at least one second client to the first client from a plurality of second clients that feed back the confirmation response.

The first display module 503 is configured to display the obtained information about the second client.

The transfer module 504 is configured to determine a second client as a target client from the second clients displayed by the first display module 503, and trigger an eWallet of the first client to transfer a specified amount to an eWallet of the target client.

In an embodiment, the providing module 501 is further configured to display an exchange request webpage provided with the exchange request interface, the exchange request webpage including a defining condition for defining the second client that provides cash-currency-exchange service.

The first sending module 502 is further configured to obtain the defining condition set in the exchange request webpage that is provided by the providing module, generate the defining condition and the current geographical location information of the first client into the exchange-service request according to the exchange request operation that is triggered on the exchange request interface, and send the exchange-service request to the server.

In an embodiment, the first display module 503 includes a first display unit and a second display unit.

The first display unit is configured to receive the information about the second client, calculate a distance between the first client and the second client according to the current geographical location information of the second client that is carried in the information about the second client, and bind and display the information about the second client and the distance; or The second display unit is configured to receive the information about the second client when the information about the second client further includes the distance between the first client and the second client, and bind and display the information about the second client and the distance between the first client and the second client.

Figure 5B:
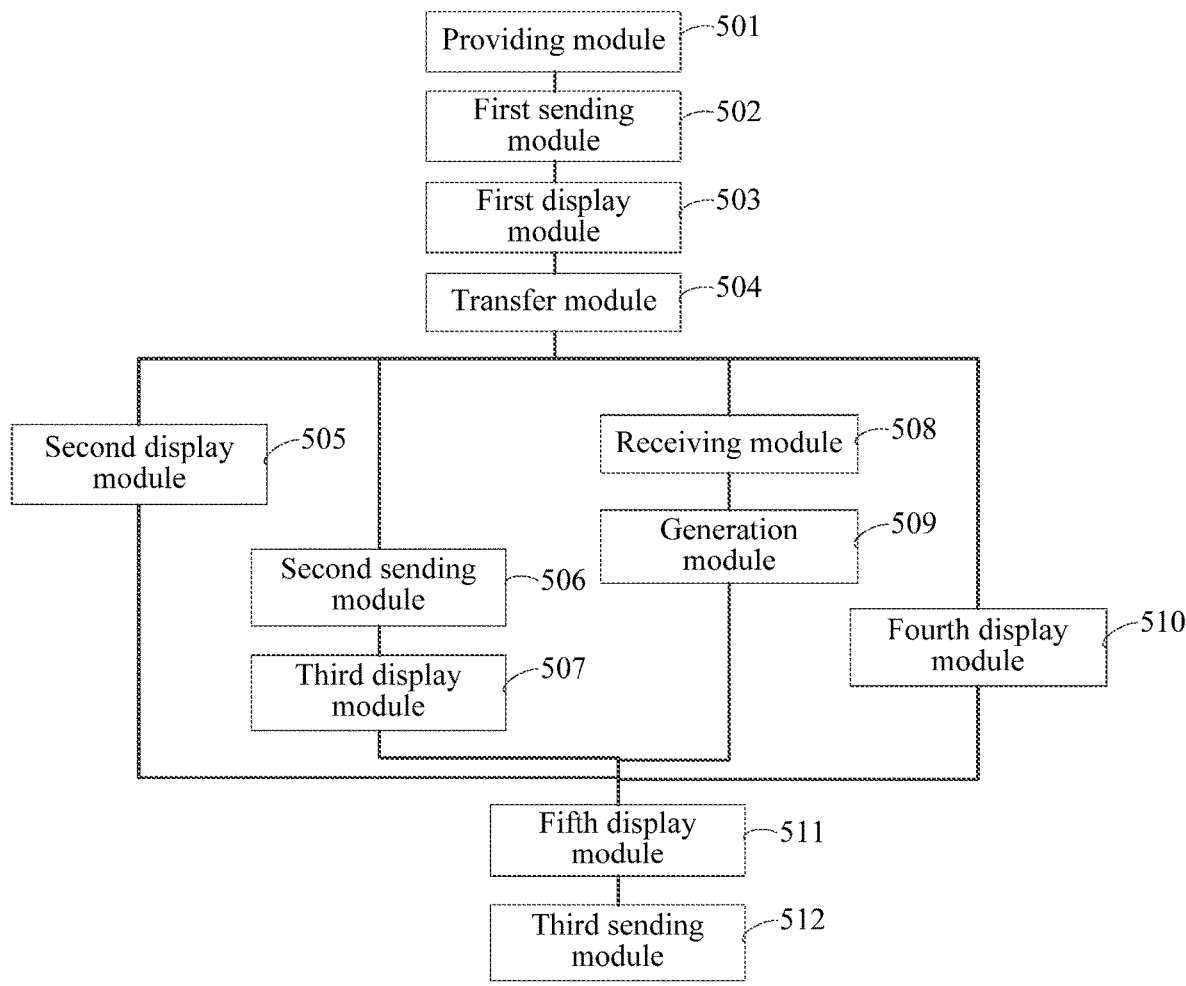
FIG. 5B is a structural block diagram of a first client according to an embodiment of the present disclosure.

In an embodiment, the first client may further include a second display module 505, as shown in FIG. 5B.

The second display module 505 is configured to generate a navigation page according to a path between the first client and the target client, and display the generated navigation page, the navigation page displaying at least real-time location information of the first client and real-time location information of the target client.

In an embodiment shown in FIG. 5B, the first client may further include a second sending module 506 and a third display module 507.

The second sending module 506 is configured to send information about the target client to the server, the information about the target client being used to trigger the server to generate a navigation page according to a path between the first client and the target client after receiving the information about the target client and when the target client is a merchant client, and being pushed to the at least one of the first client and the target client.

The third display module 507 is configured to display the navigation page when the navigation page pushed by the server is received, the displayed navigation page displaying at least the real-time location information of the first client and the real-time location information of the target client.

In an embodiment shown in FIG. 5B, the first client may further include a receiving module 508 and a generation module 509.

The receiving module 508 is configured to receive location information that is of an intermediate merchant client and that is pushed by the server, the location information of the intermediate merchant client being information about the intermediate merchant client, whose location is closest to a location at which the first client is located, that is determined by the server after the server receives the information about the target client that is selected by the first client and when the target client is a user client, and a merchant corresponding to the intermediate merchant client being capable of verifying authenticity of cash currency.

The generation module 509 is configured to generate a navigation page by using a path between the first client and the intermediate merchant client, the generated navigation page displaying the real-time location information of the first client, real-time location information of the second client, and the location information of the intermediate merchant client.

In an embodiment shown in FIG. 5B, the first client may further include a fourth display module 510.

The fourth display module 510 is configured to receive and display a navigation page that is pushed by the server and that is based on information about the location at which the intermediate merchant client is located, the navigation page being a navigation page generated, according to the path between the first client and the intermediate merchant client, by the server by determining the intermediate merchant client whose location is closest to the location at which the first client is located after the server receives the information about the target client that is selected by the first client and when the target client is a user client, and a merchant corresponding to the intermediate merchant client being capable of verifying authenticity of the cash currency.

In an embodiment, the transfer module 504 may include a first transfer unit and a second transfer unit.

The first transfer unit is configured to trigger the eWallet of the first client to transfer the specified amount to the eWallet of the target client when a location of the first client is same to that of the target client.

The second transfer unit is configured to display a transfer control, and trigger, according to a transfer triggering operation that is triggered based on the transfer control, the eWallet of the first client to transfer the specified amount to the eWallet of the target client, when the location of the first client is same to that of the target client.

In an embodiment shown in FIG. 5B, the first client may further include a fifth display module 511 and a third sending module 512.

The fifth display module 511 is configured to display an amount transfer success page after the eWallet of the first client successfully transfers the specified amount to the eWallet of the target client.

The third sending module 512 is configured to send an exchange success notification to the server after a confirmation control provided on the amount transfer success page that is displayed by the fifth display module 511 is triggered, where the exchange success notification is used to trigger the server to obtain a type of the target client that completes transferring of the specified amount, push a first resource collection item for exchanging for an article provided by the target client to the first client when the target client is the merchant client, and push a second resource collection item for exchanging for an article provided by a specific merchant to the first client and the target client when the target client is the user client.

Accordingly, the first client provided in the embodiments of the present disclosure sends the exchange-service request to the server, to receive a second client that is recommended by the server and that is relatively close to the first client, selects one second client as the target client according to the recommended second client, and performs cash currency exchange with the target client. Because the second client is relatively close to the first client, the efficiency of exchanging the cash currency of the first client may be improved.

In addition, the first client may further obtain a second client that meets the defining condition according to the defining condition for the second client, so as to improve possibility and security for the first client to make friends with the target client.

Figure 6A:
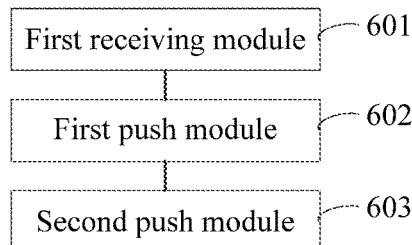
FIG. 6A is a structural block diagram of a server according to an embodiment of the present disclosure.

FIG. 6A is a structural block diagram of a server according to an embodiment of the present disclosure. The server includes a first receiving module 601, a first push module 602, and a second push module 603.

The first receiving module 601 is configured to receive an exchange-service request sent by a first client, the exchange-service request carrying at least current geographical location information of the first client.

The first push module 602 is configured to obtain at least one second client in a preset range according to at least the current geographical location information of the first client, and push an exchange-service item corresponding to the exchange-service request to the at least one second client, the exchange-service item being used to trigger the second client to send a confirmation response of the exchange-service item to the server according to a confirmation operation that is triggered based on a confirmation control of the exchange-service item.

The second push module 603 is configured to push information about the at least one second client to the first client from a plurality of second clients that feed back the confirmation response, the at least one second client being used to trigger the first client to determine a second client as a target client from the at least one second clients, and trigger an eWallet of the first client to transfer a specified amount to an eWallet of the target client.

In an embodiment, the exchange-service request further carries a defining condition, and the first push module 602 is further configured to obtain, according to the current geographical location information of the first client, at least one second client that is in the preset range and that meets the defining condition, and push an exchange-service item corresponding to the exchange-service request to the at least one second client.

In an embodiment, the second push module 603 is further configured to determine a second client that meets a push condition from the second clients that feed back the confirmation response, and push information about the second client that meets the push condition to the first client.

The second client that meets the push condition is a first second client that feeds back the confirmation response, or all second clients that feed back the confirmation response, or a second client that feeds back the confirmation response and that meets the defining condition carried in the exchange-service request, or a second client that feeds back the confirmation response and that is closest to the first client.

In an embodiment, the server may further include a second receiving module 604 and a third push module 605.

The second receiving module 604 is configured to receive information about the target client that is selected by the first client.

The third push module 605 is configured to generate a navigation page according to a path between the first client and the target client when the target client is a merchant client, and push the navigation page to at least one of the first client and the target client.

Figure 6B:
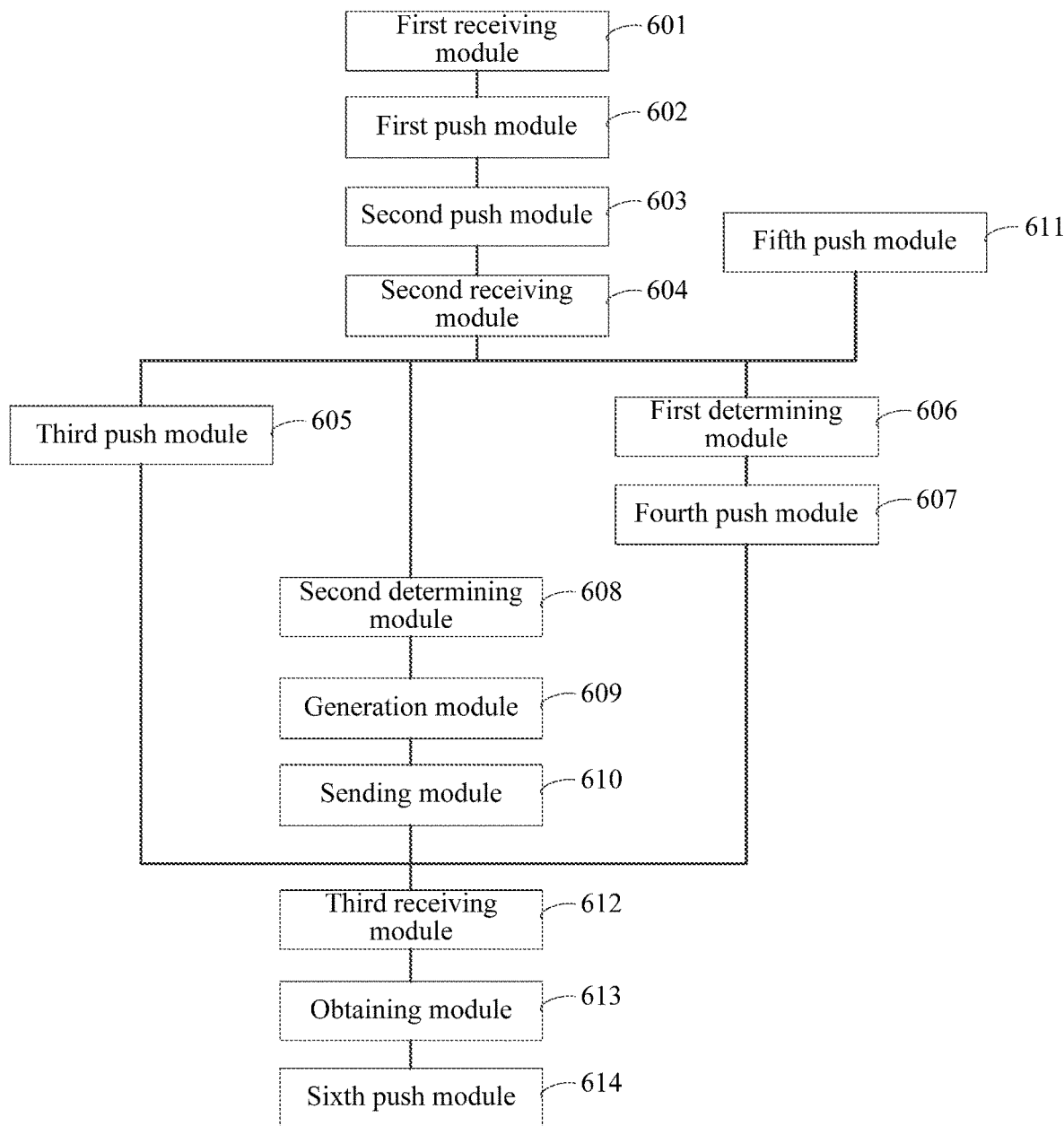
FIG. 6B is a structural block diagram of a server according to an embodiment of the present disclosure.

In an embodiment shown in FIG. 6B, the server may further include a first determining module 606 and a fourth push module 607.

The first determining module 606 is configured to determine an intermediate merchant client whose location is closest to a location at which the first client is located when the target client is a user client.

The fourth push module 607 is configured to push location information of the intermediate merchant client to the first client and the selected target client, a merchant corresponding to the intermediate merchant client being capable of verifying authenticity of cash currency.

In an embodiment shown in FIG. 6B, the server may further include a second determining module 608, a generation module 609, and a sending module 610.

The second determining module 608 is configured to determine an intermediate merchant client whose location is closest to a location at which the first client is located when the target client is a user client.

The generation module 609 is configured to generate a first navigation page according to a path between the first client and the intermediate merchant client, and generate a second navigation page according to a path between the target client and the intermediate merchant client.

The sending module 610 is configured to send the first navigation page to the first client, and send the second navigation page to the target client, a merchant corresponding to the intermediate merchant client being capable of verifying authenticity of cash currency.

In an embodiment shown in FIG. 6B, the server may further include a fifth push module 611.

The fifth push module 611 is configured to push, when a predetermined number of confirmation responses fed back regarding the exchange-service item are received, a confirmation end notification to another second client that pushes the exchange-service item, where the predetermined number is at least one, and confirmation end notification is used to trigger the second client to set the displayed confirmation control of the exchange-service item corresponding to the confirmation end notification to be operation-prohibited.

In a possible implementation, the first push module 602 is further configured to detect whether the number of sending the exchange-service request in a predetermined time period by the first client is smaller than a predetermined threshold, and obtain the at least one second client in the preset range according to at least the current geographical location information of the first client if the number of sending the exchange-service request in the predetermined time period by the first client is smaller than the predetermined threshold. Or the first push module 602 is further configured to detect whether a total value successfully transferred in a predetermined time period by the first client is smaller than a predetermined threshold, and obtain the at least one second client in the preset range according to at least the current geographical location information of the first client if the total value successfully transferred in the predetermined value period by the first client is smaller than the predetermined threshold.

In an embodiment shown in FIG. 6B, the server may further include a third receiving module 612, an obtaining module 613, and a sixth push module 614.

The third receiving module 612 is configured to receive an exchange success notification, the exchange success notification being sent by the first client after the eWallet of the first client successfully transfers the specified amount to the eWallet of the target client.

The obtaining module 613 is configured to obtain a type of the target client that completes transferring of the specified amount.

The sixth push module 614 is configured to push a first resource collection item for exchanging for an article provided by the target client to the first client when the target client is the merchant client, and push a second resource collection item for exchanging for an article provided by a specific merchant to the first client and the target client when the target client is the user client.

Accordingly, according to the server provided in the embodiments of the present disclosure, the recommendation efficiency is improved by recommending to the first client a second client that is relatively close to the first client.

In addition, by recommending a second client that is relatively close to the first client and that meets the defining condition of the first client to the first client, the server further enables the first client to better select the expected second client, and may further improve possibility for the first client to be a friend of the second client.

The server may further set the intermediate merchant client for the first client and the target client when determining that the target client is an individual client, so that both the first client and the target client perform cash currency exchange from the intermediate merchant client. Because the intermediate merchant client may provide a service of verifying the authenticity of the cash currency, reliability of the cash currency exchange is improved.

The server may further generate navigation pages for the first client and the target client, so as to guide the first client and the target client to arrive at a same destination to perform an exchange transaction, avoiding a situation in which the first client and the target client do not know a way and cannot perform the cash currency exchange face to face.

Figure 7A:
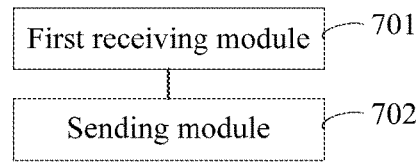
FIG. 7A is a structural block diagram of a second client according to an embodiment of the present disclosure.

FIG. 7A is a structural block diagram of a second client according to an embodiment of the present disclosure. The second client includes a first receiving module 701 and a sending module 702.

The first receiving module 701 is configured to receive an exchange-service item, the exchange-service item being pushed to at least one second client after a first client sends an exchange-service request carrying at least current geographical location information of the first client to a server, and the server obtains the at least one second client in a preset range according to at least the current geographical location information of the first client.

The sending module 702 is configured to send a confirmation response of the exchange-service item to the server according to a confirmation operation that is triggered based on a confirmation control of the exchange-service item, the confirmation response being used to trigger the server to push information about the at least one second client to the first client from a plurality of second clients that feed back the confirmation response, and the first client determining a second client as a target client from the information about the at least one second client, and triggering an eWallet of the first client to transfer a specified amount to an eWallet of the target client.

Figure 7B:
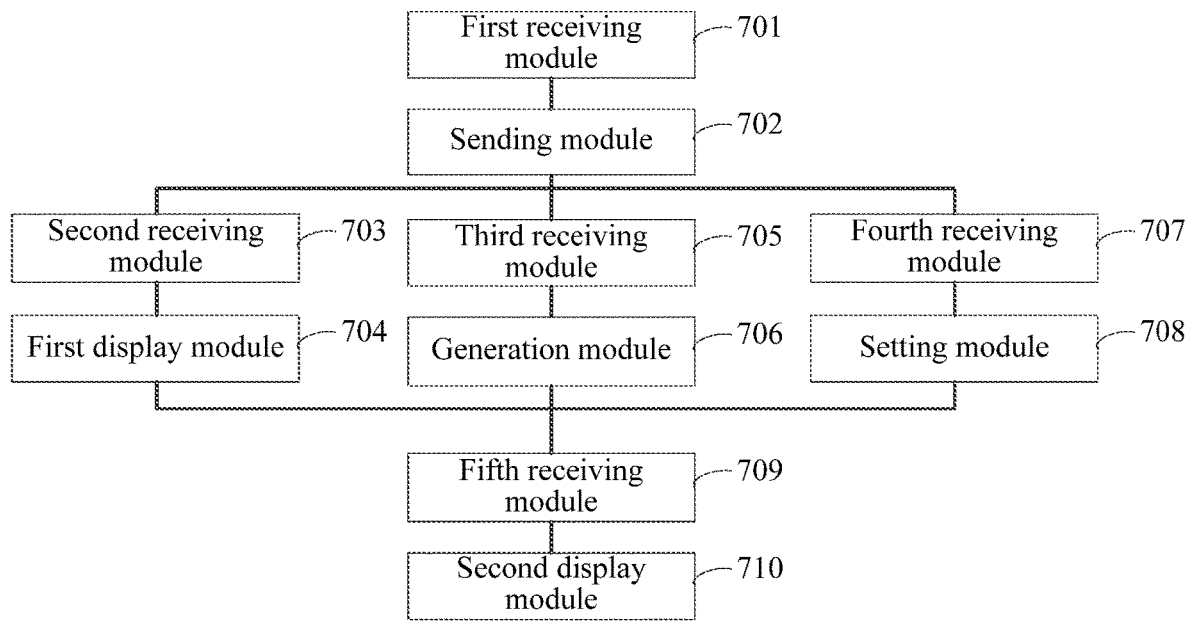
FIG. 7B is a structural block diagram of a second client according to an embodiment of the present disclosure.

In an embodiment, the second client may further include a second receiving module 703 and a first display module 704, as shown in FIG. 7B.

The second receiving module 703 is configured to receive a navigation page pushed by the server, the navigation page being a navigation page generated by the server according to a path between the first client and the second client, or being a navigation page generated by the server according to a path between the second client and an intermediate merchant client when the server determines that the second client is a user client, and the intermediate merchant client being an intermediate merchant client closest to a location of the first client.

The first display module 704 is configured to display the navigation page received by the second receiving module 703.

In an embodiment shown in FIG. 7B, the second client may further include a third receiving module 705 and a generation module 706.

The third receiving module 705 is configured to receive location information that is of an intermediate merchant client and that is pushed by the server, the intermediate merchant client being an intermediate merchant client whose location is closest to a location at which the first client is located, and a merchant corresponding to the intermediate merchant client being capable of verifying authenticity of cash currency.

The generation module 706 is configured to generate a navigation page by using a path between the second client and the intermediate merchant client, the generated navigation page displaying real-time location information of the first client, real-time location information of the second client, and the location information of the intermediate merchant client.

In an embodiment shown in FIG. 7B, the second client may further include a fourth receiving module 707 and a setting module 708.

The fourth receiving module 707 is configured to receive a confirmation end notification, the confirmation end notification being pushed to the second client when the server receives a predetermined number of confirmation responses fed back regarding the exchange-service item.

The setting module 708 is configured to set the displayed confirmation control of the exchange-service item corresponding to the confirmation end notification to be operation-prohibited.

In an embodiment shown in FIG. 7B, the second client may further include a fifth receiving module 709 and a second display module 710.

The fifth receiving module 709 is configured to receive a resource collection item pushed by the server, the resource collection item being a second resource collection item that is pushed to the target client and that is used to exchange for an article provided by a specific merchant, when the first client sends an exchange success notification to the server after the eWallet of the first client successfully transfers the specified amount to the eWallet of the target client and when the server determines that the target client is the user client.

The second display module 710 is configured to display the resource collection item.

Accordingly, the second client providing the cash-currency-exchange service that is provided in the embodiments of the present disclosure is recommended by the server to the first client by performing order preemption on the exchange-service item of the first client. When the second client is selected by the first client to be the target client, an eWallet of the second client is used to receive the specified amount of the eWallet of the first client, so that a user of the second client delivers to a user of the first client cash currency equal to the specified amount.

Figure 8:
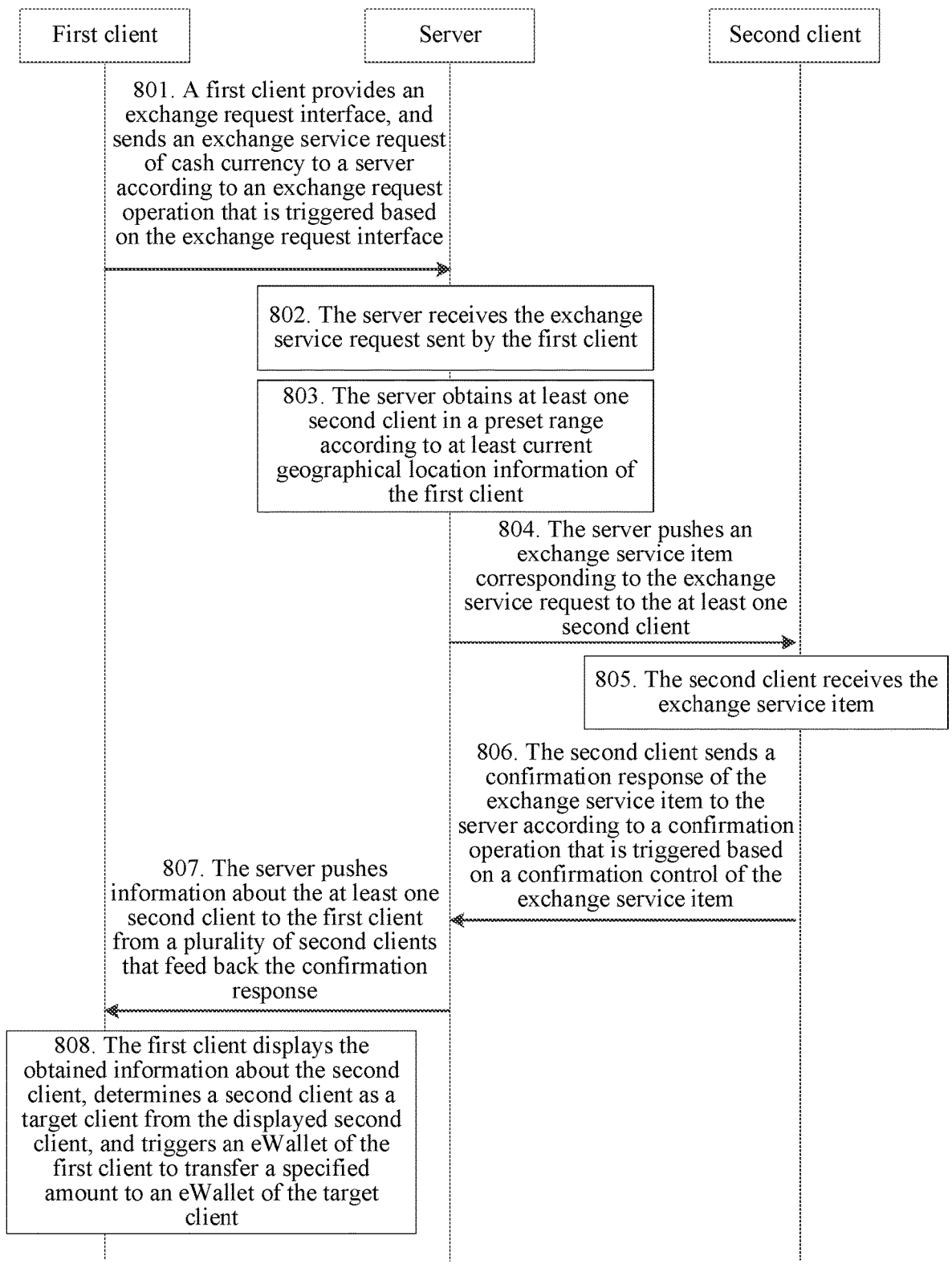
FIG. 8 is a flowchart of a method requesting a cash currency exchange service according to an embodiment of the present disclosure.

FIG. 8 is a flowchart of a method requesting cash-currency-exchange service according to an embodiment of the present disclosure. The method requesting cash-currency-exchange service is described by using an example in which the method is applied to the system shown in FIG. 1. The method includes the followings.

Step 801: A first client provides an exchange request interface, and sends an exchange-service request of cash currency to a server according to an exchange request operation that is triggered on the exchange request interface.

The exchange-service request carries at least current geographical location information of the first client.

Optionally, in this step, the first client may display an exchange request webpage provided with the exchange request interface, the exchange request webpage including a defining condition for defining the second client that provides the cash-currency-exchange service. The first client obtains the defining condition set in the exchange request webpage, generates the defining condition and the current geographical location information of the first client into the exchange-service request according to the exchange request operation that is triggered on the exchange request interface, and sends the exchange-service request to the server.

Step 802: The server receives the exchange-service request sent by the first client.

Step 803: The server obtains at least one second client in a preset range according to at least current geographical location information of the first client.

Step 804: The server pushes an exchange-service item corresponding to the exchange-service request to the at least one second client.

Step 805: The second client receives the exchange-service item.

Step 806: The second client sends a confirmation response of the exchange-service item to the server according to a confirmation operation that is triggered based on a confirmation control of the exchange-service item.

Step 807: The server pushes information about the at least one second client to the first client from a plurality of second clients that feed back the confirmation response.

Step 808: The first client displays the obtained information about the second client, determines a second client as a target client from the displayed second client, and triggers an eWallet of the first client to transfer a specified amount to an eWallet of the target client.

According to the method for supporting cash currency exchange provided in one embodiment of the present disclosure, by using the server to search, for the first client requesting the cash-currency-exchange service, at least one second client providing the cash-currency-exchange service, the eWallet of the first client is triggered to transfer the specified amount to the eWallet of the second client. Further, a user of the first client withdraws the cash currency equal to the specified amount from a user or a merchant of the second client. The second client in the network has relatively more users, and the second client recommended to the first client by the server is relatively close to the first client. Therefore, the following situation in the prior art is improved: a cash withdraw process is much time-consuming due to that people needs to withdraw cash in a relatively long distance when needing to withdraw the cash at a bank or an ATM because banks or ATMs are sparsely distributed, thereby achieving a quick cash withdrawal.

Figure 9:
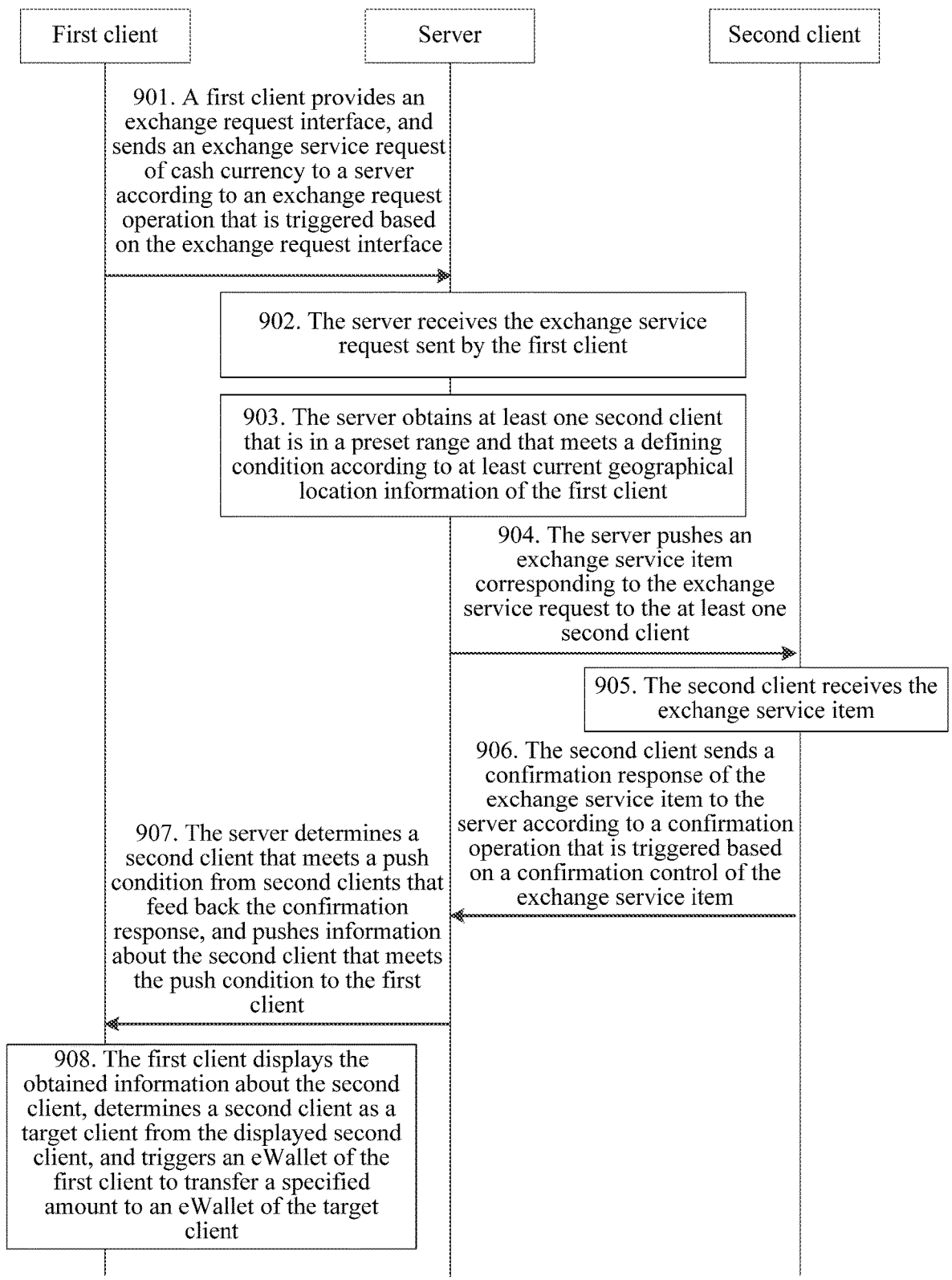
FIG. 9 is a flowchart of a method requesting a cash currency exchange service according to another embodiment of the present disclosure.

FIG. 9 is a flowchart of a method requesting cash-currency-exchange service according to another embodiment of the present disclosure. The method requesting cash-currency-exchange service is described by using an example in which the method is applied to the system shown in FIG. 1. The method includes the followings.

Step 901: A first client provides an exchange request interface, and sends an exchange-service request of cash currency to a server according to an exchange request operation that is triggered on the exchange request interface. The exchange-service request carries at least current geographical location information of the first client.

Step 902: The server receives the exchange-service request sent by the first client.

To prevent the first client from performing illegal cash exchanges such as frequent cash exchanges or cash exchange in large amounts, in one embodiment of the present disclosure, the server needs to determine a cash exchange frequency or a cash exchange amount of the first client after receiving the exchange-service request sent by the first client. In an exemplary embodiment:

Using the exchange frequency as an example, the server 120 detects whether the number of sending exchange-service item in a predetermined time period by the first client 110 is smaller than a predetermined threshold, after receiving the exchange-service request sent by the first client 110; and step 903 is performed if the number of sending the exchange-service item in the predetermined time period by the first client 110 is smaller than the predetermined threshold.

Using the exchange amount as an example, the server 120 detects whether a total value successfully transferred in a predetermined time period by the first client 110 is smaller than a predetermined threshold, after receiving the exchange-service request sent by the first client 110; and step 903 is performed if the total value successfully transferred in the predetermined time period by the first client 110 is smaller than the predetermined threshold.

Step 903: The server obtains at least one second client that is in a preset range and that meets a defining condition according to at least current geographical location information of the first client.

The server 120 pre-stores most recent geographical location information of the second client 130. Optionally, the second client 130 may also report the most recent geographical location information thereof to the server 120 in real time.

There are a lot of second clients 130, and some second clients 130 are much far away from the first client 110. These second clients 130 that are much far away need to walk for a relatively long distance for exchanging the cash currency. Therefore, it is not suggested to recommend these second clients 130 to the first client 110. Considering this situation, the server 120 first parses out a current geographical location of the first client 110 from the exchange-service request, subsequently obtains, according to the current geographical location information of the first client 110, the at least one second client 130 that is in the preset range and that meets the defining condition, and then screens the second client 130 that meets the defining condition carried in the exchange-service request from these second clients 130.

Optionally, the exchange-service request may do not include the current geographical location information of the first client 110. However, the server 120 stores the most recent geographical location information of the first client 110, and the geographical location information usually is reported to the server 120 by the first client in real time. Therefore, the most recent geographical location information of the first client 110 that is stored in the server 120 usually may also represent the current geographical location of the first client 110.

Step 904: The server pushes an exchange-service item corresponding to the exchange-service request to the at least one second client.

Step 905: The second client receives the exchange-service item.

Step 906: The second client sends a confirmation response of the exchange-service item to the server according to a confirmation operation that is triggered based on a confirmation control of the exchange-service item.

Step 907: The server determines a second client that meets a push condition from second clients that feed back the confirmation response, and pushes information about the second client that meets the push condition to the first client.

In a possible implementation, the server 120 has more second clients 130 that send a service exchange item, and the number of the second clients 130 that feed back the confirmation response is not defined. Therefore, the server 120 may receive confirmation responses fed back by relatively more second clients 130, that is, there may be more second clients 130 that perform order preemption. In this case, the server 120 may push all or some of these second clients 130 to the first client 110.

Optionally, the second client 130 that meets the push condition is a first second client 130 that feeds back the confirmation response, or all second clients 130 that feed back the confirmation response, or one or more second clients 130 that feed back the confirmation response and that are closest to the first client 110, or a predetermined number of second clients 130 that feed back the confirmation response and that have highest service levels.

In a possible implementation scenario, the server 120 directly obtains the at least one second client 130 in the preset range according to the current geographical location information of the first client 110 after receiving the exchange-service request that is sent by the first client and that carries the defining condition, and pushes the exchange-service item of the exchange-service request to these second clients 130. Therefore, the server 120 may further push the second client 130 that feeds back the confirmation response and that meets the defining condition to the first client 110, after receiving the confirmation response fed back by the second client 130. That is, the second client 130 that meets the push condition may alternatively be the second client 130 that feeds back the confirmation response and that meets the defining condition carried in the exchange-service request.

Step 908: The first client displays the obtained information about the second client, determines a second client as a target client from the displayed second client, and triggers an eWallet of the first client to transfer a specified amount to an eWallet of the target client.

Accordingly, according to the method for supporting cash currency exchange provided in one embodiment of the present disclosure, by using the server to search, for the first client requesting the cash-currency-exchange service, at least one second client providing the cash-currency-exchange service, the eWallet of the first client is triggered to transfer the specified amount to the eWallet of the second client. Further, a user of the first client withdraws the cash currency equal to the specified amount from a user or a merchant of the second client. The second client in the network has relatively more users, and the second client recommended to the first client by the server is relatively close to the first client. Therefore, the following situation in the prior art is improved: in the prior art, a cash withdraw process is very time-consuming due to people needing to travel a relatively long distance to a bank or an ATM because banks or ATMs are sparsely distributed, whereas the disclosed method can achieve a quick cash withdrawal since the second client recommended to the first client by the server is relatively close to the first client.

In addition, the server screens a second client that meets the defining condition and that is relatively close to the first client according to the exchange-service request sent by the first client, so that the second client that meets the defining condition and that is relatively close to the first client is qualified to perform order preemption on the requested exchange service.

The first client selects one second client as the target client for an exchange transaction according to information about the second client recommended by the server. To guide the first client and the second client to transact quicker, a navigation page related to the first client and the second client may further be displayed on the first client. Reference may be made to four implementations shown in FIG. 10A to FIG. 10D for details.

Figure 10A:
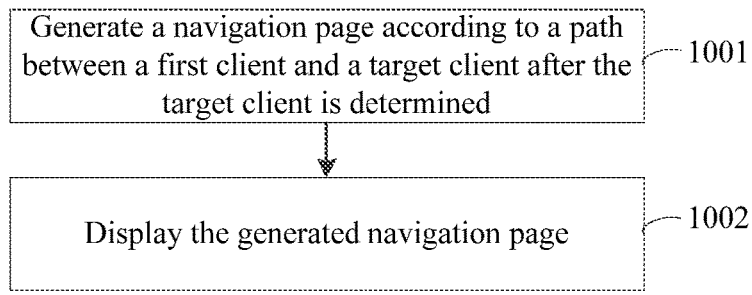
FIG. 10A to FIG. 10D are flowcharts of generating and displaying a navigation page according to some embodiments of the present disclosure.

In a first implementation, the first client generates the navigation page locally, as shown in FIG. 10A, and may include the following steps:

Step 1001: Generate the navigation page according to a path between the first client and the target client after the target client is determined.

The navigation page displays at least real-time location information of the first client 110 and real-time location information of the target client.

Optionally, the first client 110 may obtain the real-time location information of the target client from the server 120 in real time.

Step 1002: Display the generated navigation page.

Location changes of the first client 110 and the target client may be displayed in real time when the navigation page is displayed, to guide the first client to arrive at the target client.

Figure 10B:
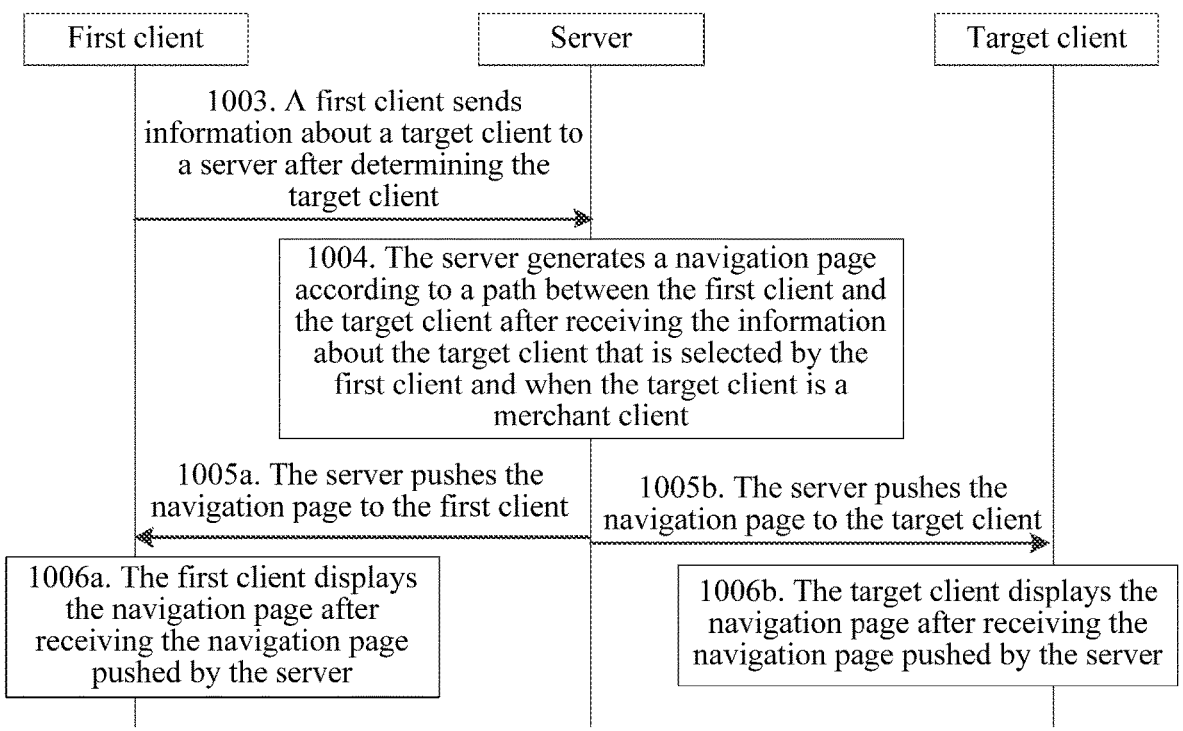

In a second implementation, when the second client 130 is a merchant client, the server 120 generates a navigation page related to geographical locations of the first client 110 and the second client 130, and pushes the generated navigation page to at least one of the first client 110 and the second client 130. As shown in FIG. 10B, the following steps may be included:

Step 1003: The first client sends information about the target client to the server after determining the target client.

Step 1004: The server generates the navigation page according to a path between the first client and the target client after receiving the information about the target client that is selected by the first client and when the target client is the merchant client.

Step 1005a: The server pushes the navigation page to the first client.

Step 1006a: The first client displays the navigation page after receiving the navigation page pushed by the server.

Step 1005b: The server pushes the navigation page to the target client.

Step 1006b: The target client displays the navigation page after receiving the navigation page pushed by the server.

In actual implementations, step 1005a and step 1006a may not be performed, or step 1005b and step 1006b may not be performed. When step 1005a, step 1006a, step 1005b, and step 1006b are performed, a sequence for performing step 1006a and step 1005b is not defined.

Figure 10C:
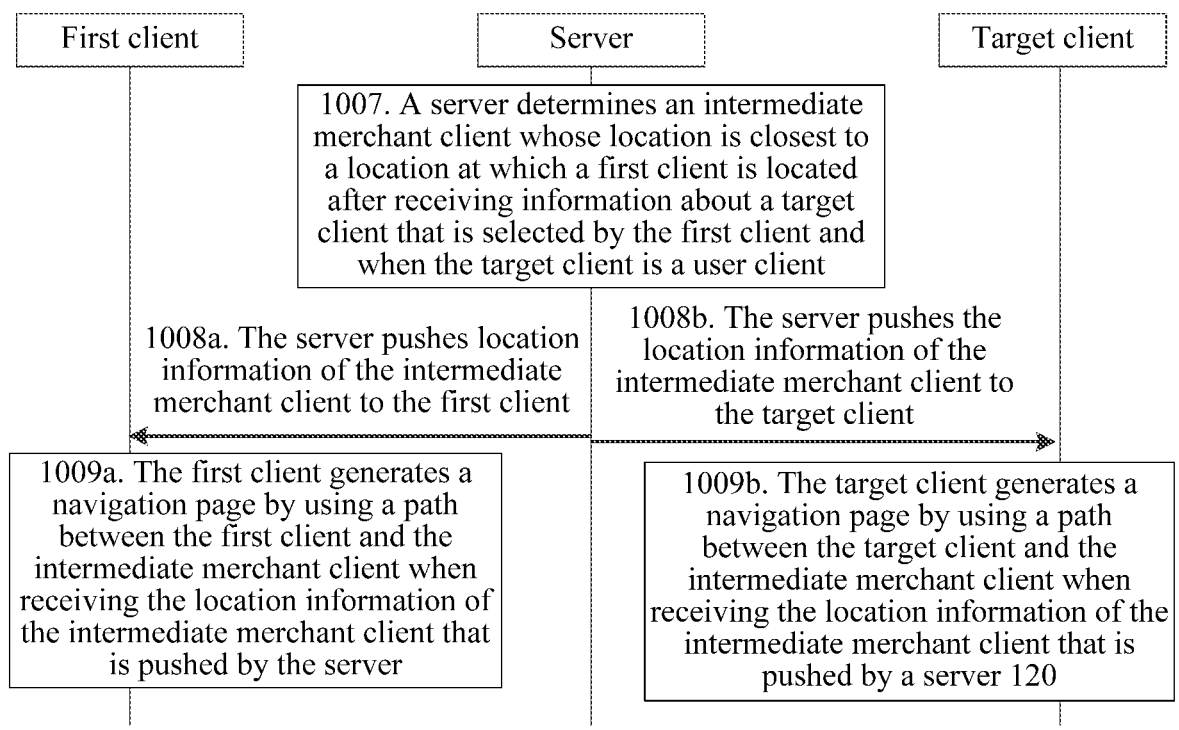

In a third implementation, the server 120 determines an intermediate merchant client that is closest to the first client 110 when the target client is a user client, and pushes the intermediate merchant client to the first client 110 and the target client. Navigation pages navigated to the intermediate merchant client are respectively generated by the first client and the target client. As shown in FIG. 10C, the following steps may be included.

Step 1007: The server determines an intermediate merchant client whose location is closest to a location at which the first client is located after receiving information about the target client that is selected by the first client and when the target client is the user client.

In actual applications, counterfeit currency may exist in the cash currency.

Therefore, to ensure security of cash currency transaction, when the target client is the user client, to avoid a situation in which users of the first client and the target client are not capable of verifying the cash currency, an intermediate merchant client needs to be provided for the first client and the target client. A merchant corresponding to the intermediate merchant client is capable of verifying authenticity of the cash currency, so as to make sure that the intermediate merchant client verifies the authenticity of the cash currency when the cash currency exchange is performed, ensuring security of the cash currency exchange.

Step 1008a: The server pushes location information of the intermediate merchant client to the first client.

Step 1008b: The server pushes the location information of the intermediate merchant client to the target client.

Step 1009a: The first client generates the navigation page by using a path between the first client and the intermediate merchant client when receiving the location information that is of the intermediate merchant client and that is pushed by the server.

Step 1009b: The target client generates the navigation page by using a path between the target client and the intermediate merchant client when receiving the location information that is of the intermediate merchant client and that is pushed by the server 120.

Figure 10D:
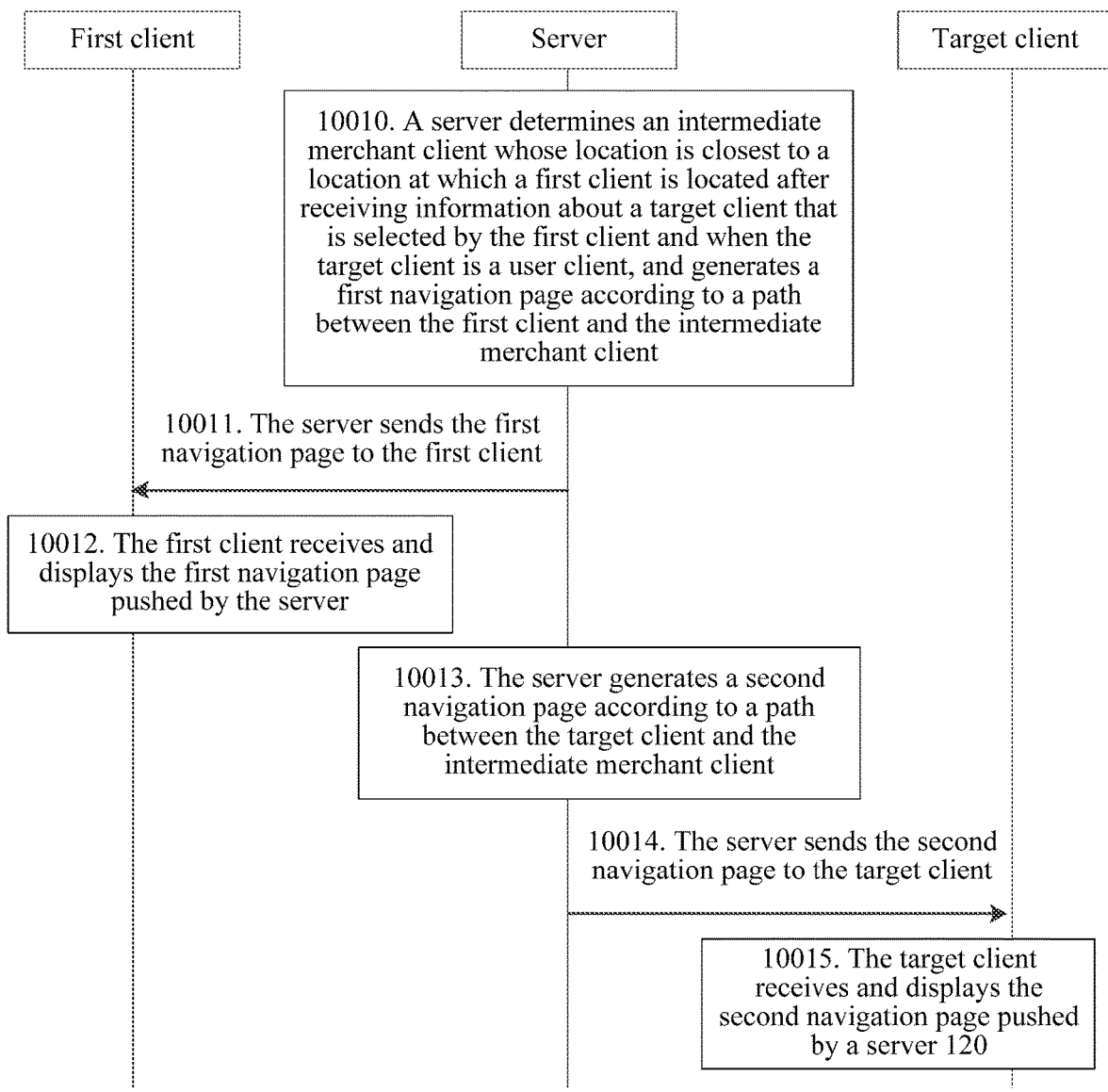

In a fourth implementation, when the target client is a user client, the server 120 generates a navigation page related to geographical locations of the first client 110, the target client, and an intermediate merchant, and pushes the generated navigation page to the first client 110 and the target client. As shown in FIG. 10D, the following steps may be included.

Step 10010: The server determines an intermediate merchant client whose location is closest to a location at which the first client is located after receiving information about the target client that is selected by the first client and when the target client is the user client, and generates a first navigation page according to a path between the first client and the intermediate merchant client.

Step 10011: The server sends the first navigation page to the first client.

Step 10012: The first client receives and displays the first navigation page pushed by the server.

Step 10013: The server generates a second navigation page according to a path between the target client and the intermediate merchant client.

Step 10014: The server sends the second navigation page to the target client.

Step 10015: The target client receives and displays the second navigation page pushed by the server 120.

Other information related to the cash-currency-exchange service, for example, a transfer interface or a transfer control that triggers the eWallet of the first client 110 to transfer a resource to an eWallet of the second client 130 may be displayed on each navigation page described above.

Accordingly, according to the method for supporting cash currency exchange provided in one embodiment of the present disclosure, after the first client determines the target client, the navigation page may be displayed at the first client or the second client, so as to guide the first client or the second client to definitely arrive at a transaction destination the quickest, and exchange the cash currency.

When the target client is not the merchant client, the navigation page may be displayed at both the first client and the second client, so as to guide the first client and the second client to arrive at the intermediate merchant the quickest, and exchange the cash currency.

There may be a plurality of transferring manners when transferring the specified amount to the eWallet of the target client by using the eWallet of the first client. Reference may be made to the flowcharts of transferring manners shown in FIG. 11A to FIG. 11C.

Figure 11A:
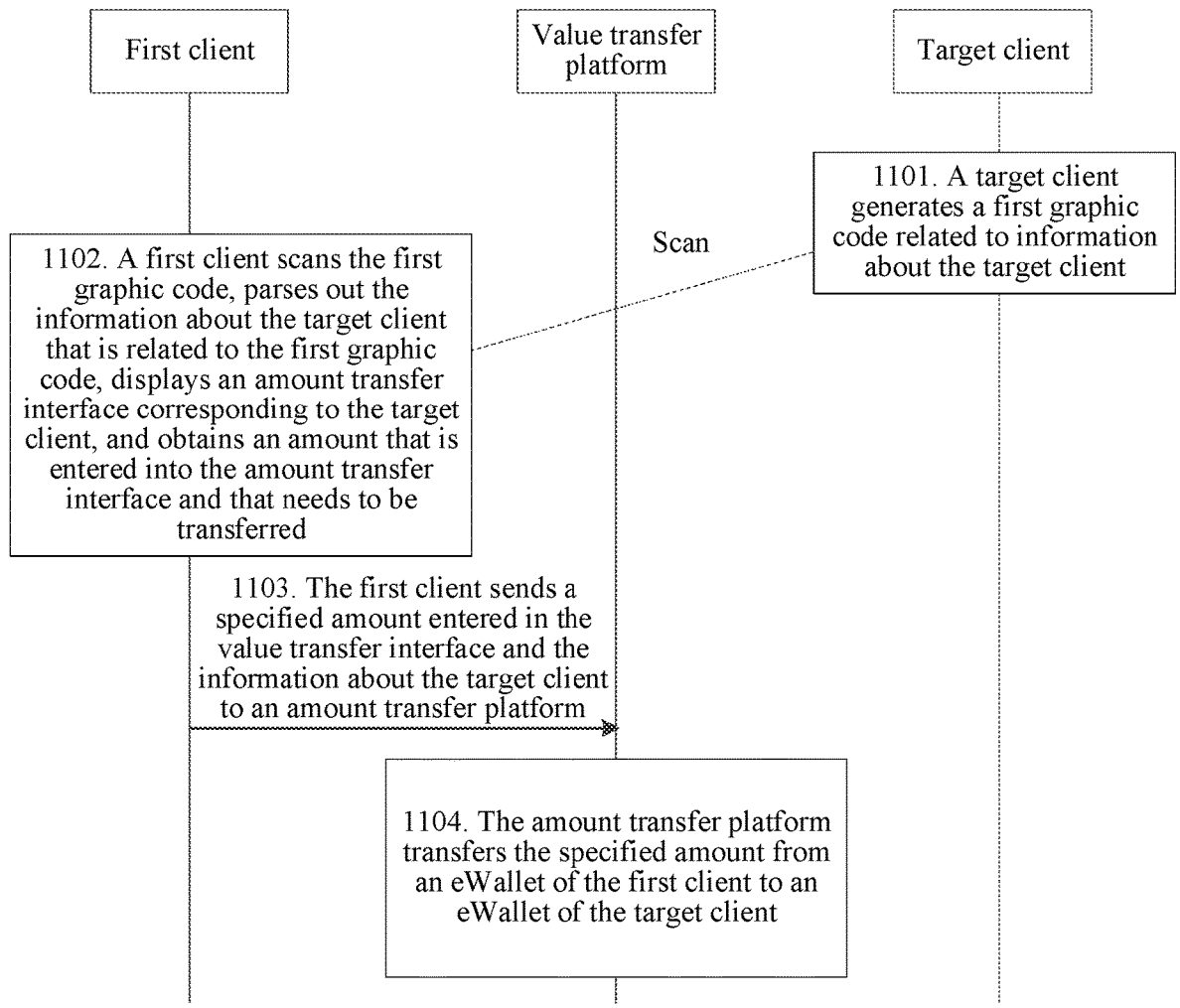
FIG. 11A to FIG. 11C are flowcharts when an eWallet transfers a specified value according to some embodiments of the present disclosure.
Figure 11B:
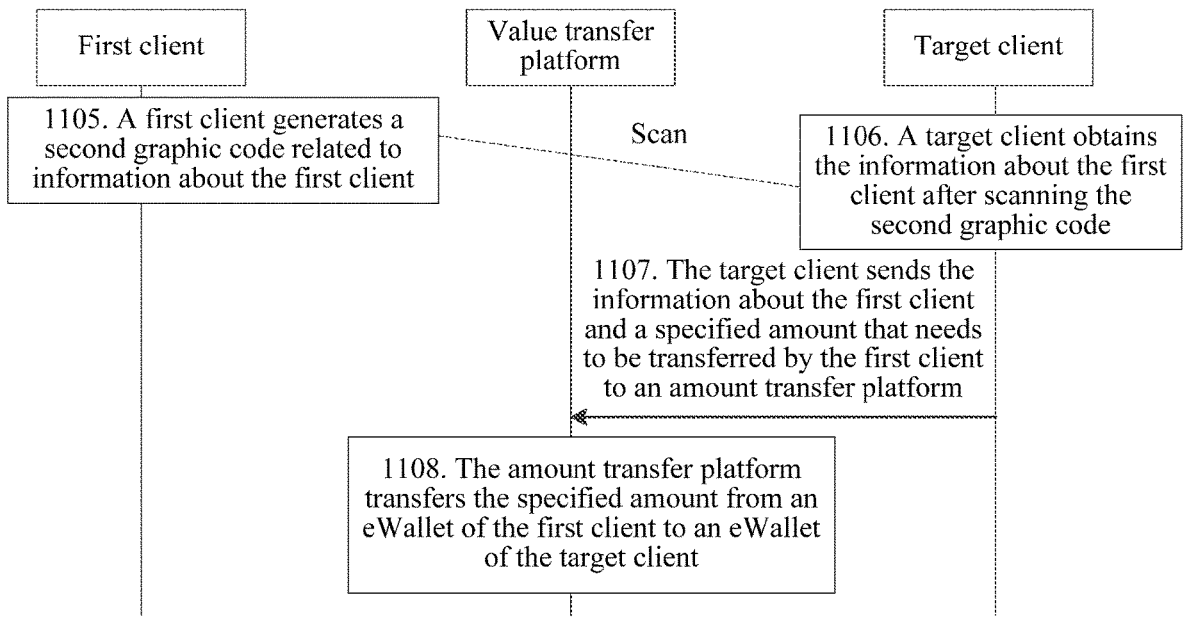

In a first transferring manner, referring to FIG. 11A, the following steps may be included:

Step 1101: The target client generates a first graphic code related to information about the target client.

Alternatively, the first graphic code related to information about the target client may be displayed on an entity display apparatus on which the target client is located, so as to be provided to the first client to be scanned.

Step 1102: The first client scans the first graphic code, parses out the information about the target client that is related to the first graphic code, displays an amount transfer interface corresponding to the target client, and obtains an amount that is entered into the amount transfer interface and that needs to be transferred.

Step 1103: The first client sends the specified amount entered in the amount transfer interface and the information about the target client to an amount transfer platform.

Step 1104: The amount transfer platform transfers the specified amount from the eWallet of the first client to the eWallet of the target client.

The amount transfer platform obtains an account of the first client and may subsequently learn an eWallet bound to the account. Similarly, the amount transfer platform obtains an account of the target client and may subsequently learn an eWallet bound to the account In a second transferring manner, referring to FIG. 11B, the following steps may be included:

Step 1105: The first client generates a second graphic code related to information about the first client.

Step 1106: The target client obtains the information about the first client after scanning the second graphic code.

Step 1107: The target client sends the information about the first client and the specified amount that needs to be transferred by the first client to the amount transfer platform.

Step 1108: The amount transfer platform transfers the specified amount from the eWallet of the first client to the eWallet of the target client.

Figure 11C:
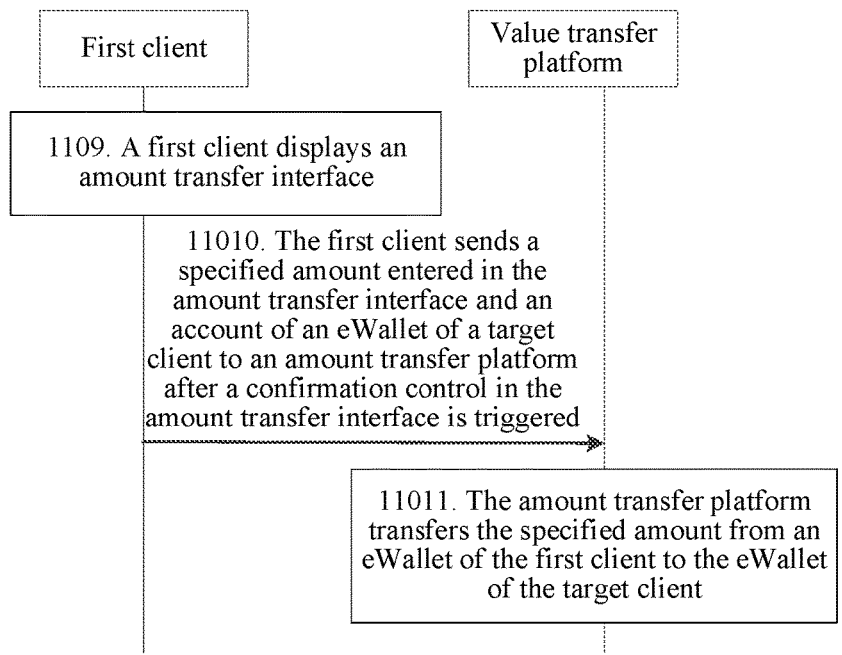

In a third transferring manner, referring to FIG. 11C, the following steps may be included:

Step 1109: The first client displays an amount transfer interface.

An amount entering box, an account entering box for receiving amount transfer, and a confirmation control are provided in the amount transfer interface. The user may enter the specified amount in the value entering box, and enter an account of the eWallet of the target client in the account entering box.

Step 11010: The first client sends the specified amount entered in the amount transfer interface and the account of the eWallet of the target client to the amount transfer platform after a confirmation control in the amount transfer interface is triggered.

Step 11011: The amount transfer platform transfers the specified amount from the eWallet of the first client to the eWallet of the target client.

The amount transfer platform herein may be a part of the server 120 in the system in FIG. 1, or may be a platform independent from the server 120.

Further, to endure integrity of the cash currency exchange, the specified amount transferred from the eWallet of the first client 110 may be first transferred to a common eWallet of the amount transfer platform. The first client 110 may display a notification page indicating that the value is successfully transferred, after the specified amount is successfully transferred to the common eWallet. After the first client 110 and the target client complete payment of the cash currency in an offline manner, a confirmation control on the notification page is triggered by the user of the first client 110. The first client 110 notifies the amount transfer platform to transfer the specified amount in the common eWallet to the eWallet of the target client, after the confirmation control is triggered. The amount transfer platform feeds back a transfer success notification to the first client 110 after the transfer succeeds.

Accordingly, according to the method for supporting cash currency exchange provided in one embodiment of the present disclosure, the first client is triggered to transfer the specified amount to the eWallet of the target client by providing an amount transfer interface for the first client, thereby helping subsequent users of the first client and the target client to perform an offline cash currency delivery.

Figure 12:
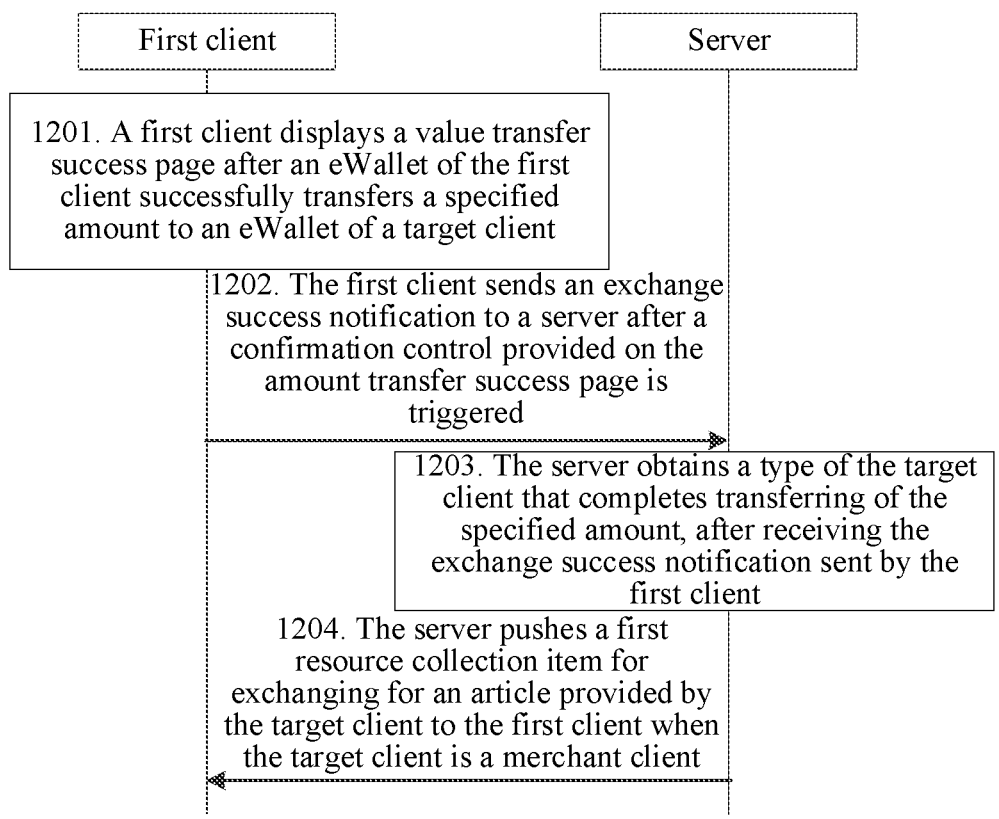
FIG. 12 is a flowchart of a method requesting a cash currency exchange service according to still another embodiment of the present disclosure.

In actual applications, the second client that provides the cash currency exchange usually is a merchant, and wants to promote products of the merchant more while providing cash-currency-exchange service. Therefore, to promote sales of the own products and enthusiasm of a merchant client in providing the cash currency, the server may push a resource collection item related to the merchant client to the merchant client requesting the cash-currency-exchange service, after the merchant client provides the cash currency service. After step 808 or step 908, the server may further push the resource collection item to the client, as shown in FIG. 12, and the following steps may be included:

Step 1201: The first client displays an amount transfer success page after the eWallet of the first client successfully transfers the specified amount to the eWallet of the target client.

Step 1202: The first client sends an exchange success notification to the server after a confirmation control provided on the amount transfer success page is triggered.

Step 1203: The server obtains a type of the target client that completes transferring of the specified amount, after receiving the exchange success notification sent by the first client.

Step 1204: The server pushes a first resource collection item for exchanging for an article provided by the target client to the first client when the target client is a merchant client.

The first resource collection item herein usually is related to the article provided by the target client, and may be, for example, a coupon of the article provided by the target client.

The server pushes a second resource collection item to the first client when the target client is a user client.

The second resource collection item is used to exchange for an article provided by a specific merchant. The second resource collection item herein may be placed in the server 120 in advance by the specific merchant. For example, the second resource collection item may be a coupon, a bonus point, or a cinema ticket of the specific merchant.

The server pushes the second resource collection item to the target client when the target client is a user client.

Optionally, the server 120 may further improve a service level of the target client after receiving the exchange success notification sent by the first client 110. The service level may serve as a factor to be considered when the server 120 screens, for the first client 110, the second client 130 providing the cash-currency-exchange service. For example, if the service level of the second client 130 is higher, the second client 130 is more likely to be recommended to a neighboring first client 110.

Accordingly, according to the method for supporting cash currency exchange provided in one embodiment of the present disclosure, the server pushes, to the first client, a resource collection item related to the target client that provides the cash currency service when the first client completes the cash currency exchange, so as to improve a promotion degree and sales of the target client.

The server provides the resource collection item, as an award, for both the first client and the target client when the first client and the target client serving as the user client complete the cash currency exchange, and may further promote the first client and the target client to use the cash-currency-exchange service.

It should be noted that the apparatus and method for supporting cash currency exchange that are provided in the foregoing embodiments, when performing the cash currency exchange, are merely described by using division of the foregoing functional modules as an example. In actual applications, the functions may be allocated to different functional modules to be completed according to requirement. That is, internal structures of the first client, the server, and the second client are divided into different functional module, so as to complete all or some of the functions described above. In addition, the apparatus and method for supporting cash currency exchange that are provided in the foregoing embodiments belong to a same concept to the embodiment of the system for supporting cash currency exchange. Reference may be made to the embodiments of the system for the specific implementation processes, and details are not described herein again.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for supporting cash currency exchange for a first client requesting a cash-currency-exchange service in a system for supporting cash currency exchange, the system including a plurality of second clients providing the cash-currency-exchange service and a server, the method comprising:
   providing, by the first client executed by a processor of a user terminal, an exchange request interface configured to initiate the cash currency exchange for exchanging currency from an eWallet to cash, and to provide a condition setting option for the cash currency exchange;
   determining, by the first client, a current geographical location of the user terminal;
   sending, by the first client, an exchange-service request of cash currency to the server according to an exchange request operation triggered on the exchange request interface, wherein the exchange-service request carries the current geographical location of the user terminal and is used to trigger the server to:
      obtain one or more second clients in a preset range from the first client according to at least the current geographical location information of the first client, the preset range being determined based on the condition setting option;
      push an exchange-service item corresponding to the exchange-service request to the one or more second clients; and
      receive a confirmation response of the exchange-service item from at least one second client of the one or more second clients;
   receiving, by the first client, information about the at least one second client pushed by the server and a terminal executing the at least one second client being located within the preset range from the user terminal;
   displaying, by the first client, the obtained information about the at least one second client;
   determining, by the first client, a second client as a target client from the at least one second client;
   receiving, by the first client, a navigation page pushed and generated by the server according to geographical locations of the first client and the target client;
   displaying, by the first client, the navigation page on a display panel, the display panel having a display panel configuration comprising a liquid crystal display (LCD) or an organic light-emitting diode (OLED) covered with a touch-sensitive surface, the navigation page being a graphical user interface (GUI), comprising:
      setting an operation attribute of a transfer control of the GUI as inoperable when the navigation page is initially displayed by the first client;
      displaying the transfer control on the navigation page as a greyed out control according to the operation attribute being inoperable; and
      displaying, on the navigation page, a real-time location indicator of the first client and a real-time location indicator of the target client;
   determining that the first client and the target client are located at a same place upon detecting that the real-time location indicator of the first client and the real-time location indicator of the target client overlap as a visual output on the display panel configuration;
   triggering an eWallet of the first client to make an amount transfer of a specified amount to an eWallet of the target client, comprising:
      when the real-time location indicator of the first client and the real-time location indicator of the target client overlap as the visual output on the display panel configuration on the navigation page displayed by the display panel, setting the operation attribute of the transfer control as operable to make the transfer control an operable transfer control;
      detecting, through the touch-sensitive surface covering the display panel, a touch operation on the operable transfer control;
      in response to determining that the first client and the target client are located at the same place and in response to detecting the touch operation on the operable transfer control, generating, by one client of the first client and the target client, a graphic code related to information about the one client;
      scanning, by the other client of the first client and the target client, the graphic code to parse out the information about the one client;
      in response to the information about the one client being parsed out, displaying, by the other client of the first client and the target client, a value transfer page to obtain the specified amount to be transferred in the amount transfer; and
      sending, by the other client of the first client and the target client, the information about the one client and the specified amount to an amount transfer platform to process the amount transfer.

2. The method according to claim 1, wherein providing the exchange request interface and sending the exchange-service request of cash currency to the server according to the exchange request operation that is triggered on the exchange request interface comprises:
   displaying an exchange request webpage provided with the exchange request interface, the exchange request webpage comprising a defining condition for defining a candidate second client that provides the cash-currency-exchange service; and obtaining the defining condition set in the exchange request webpage, generating the defining condition and the current geographical location information of the first client into the exchange-service request according to the exchange request operation that is triggered on the exchange request interface, and sending the exchange-service request to the server.

3. The method according to claim 1, further comprising:

receiving the information about the second client, calculating a distance between the first client and the second client according to the current geographical location information of the second client that is carried in the information about the second client, and binding and displaying the information about the second client and the distance; and when the information about the second client further includes the distance between the first client and the second client, receiving the information about the second client, and binding and displaying the information about the second client and the distance between the first client and the second client.

4. The method according to claim 1, wherein, after the determining of the second client as the target client from the displayed at least one second client, the method further comprises:

sending information about the target client to the server, the information about the target client being used to trigger the server to generate the navigation page according to a path between the first client and the target client after receiving the information about the target client and when the target client is a merchant client, and being pushed to at least one of the first client and the target client.

5. The method according to claim 4, further comprising:

receiving and displaying a navigation page based on information about a location at which an intermediate merchant client is located that is pushed by the server, the navigation page being a navigation page generated, according to a path between the first client and the intermediate merchant client, by the server by determining the intermediate merchant client whose location is closest to a location at which the first client is located after receiving the information about the target client that is selected by the first client and when the target client is a user client, and a merchant corresponding to the intermediate merchant client being capable of verifying authenticity of cash currency.

6. The method according to claim 1, wherein the one or more second clients are applications connected to the server and are not an automatic teller machine (ATM) or a bank facility.

7. The method according to claim 1, wherein the first client and the one or more second clients are the same applications.

8. The method according to claim 1, further comprising:

displaying an amount transfer success page after the eWallet of the first client successfully transfers the specified amount in the amount transfer to the eWallet of the target client;

sending an exchange success notification to the server after a confirmation control provided on the amount transfer success page is triggered, wherein the exchange success notification is used to trigger the server to obtain a type of the target client that completes transferring of the specified amount in the amount transfer; and after the first client transfers the specified amount in the amount transfer to the eWallet of the target client and sends the exchange success notification, receiving, by the first client from the server, a first resource collection item for exchanging for a first article provided by the target client as a promotion of the target client for completing the transferring of the specified amount when the target client is a merchant type client, and a second resource collection item for exchanging for a second article provided by a specific merchant as an award for completing the transferring of the specified amount when the target client is a user type client, wherein after the first client transfers the specified amount to the eWallet of the target client and sends the exchange success notification, the target client also receives, from the server, the second resource collection item as the award for completing the transferring of the specified amount when the target client is the user type client.

9. The method according to claim 1, wherein:

receiving, by the first client, the navigation page pushed and generated by the server comprises:

receiving location information of an intermediate merchant client pushed by the server, the location information of the intermediate merchant client being information about the intermediate merchant client determined by the server in response to the server receiving the information about the target client selected by the first client and the target client being a user client, and the intermediate merchant client also being a client located closest to the first client and connected to a device capable of verifying authenticity of the cash currency; and further wherein displaying, by the first client, the navigation page comprises:

generating the navigation page by using a path between the first client and the intermediate merchant client, the generated navigation page displaying the real-time location indicator of the first client, the real-time location indicator of the target client, and the location indicator of the intermediate merchant client.

10. The method according to claim 9, wherein the intermediate merchant client is coupled to a common currency detector configured to verify authenticity of the cash currency being exchanged.

11. The method according to claim 9, wherein triggering the eWallet of the first client to make the amount transfer of the specified amount to the eWallet of the target client further comprises:

when the real-time location indicator of the first client, the real-time location indicator of the intermediate merchant client and the real-time location indicator of the target client overlap as a visual output on the display panel configuration on the displayed navigation page, setting the operation attribute of the transfer control as operable to make the transfer control an operable transfer control;

determining, by the intermediate merchant client, that the cash currency to be exchanged is authentic; and in response to determining that cash currency is authentic, sending, by the other client of the first client and the target client, the information about the one client and the specified amount to an amount transfer platform to process the transfer.

12. An apparatus for supporting cash currency exchange for a first client requesting a cash-currency-exchange service in a system for supporting cash currency exchange, the system including a plurality of second clients providing the cash-currency-exchange service and a server, the apparatus comprising:

a memory;
a display panel having a display panel configuration comprising a liquid crystal display (LCD) or an organic light-emitting diode (OLED);
a touch-sensitive surface covering the display panel and configured to detect a touch operation; and
a processor coupled to the memory and configured to perform:
providing an exchange request interface configured to initiate the cash currency exchange for exchanging currency from an eWallet of the first client to cash, and to provide a condition setting option for the cash currency exchange;
determining a current geographical location of the apparatus;
sending an exchange-service request of cash currency to the server according to an exchange request operation triggered on the exchange request interface, wherein the exchange-service request carries the current geographical location of the apparatus and is used to trigger the server to:
  obtain one or more second clients in a preset range from the first client according to at least the current geographical location information of the first client, the preset range being determined based on the condition setting option;
  push an exchange-service item corresponding to the exchange-service request to the one or more second clients; and
  receive a confirmation response of the exchange-service item from at least one second client of the one or more second clients;
receiving information about the at least one second client pushed by the server and a terminal executing the at least one second client being located within the preset range from the apparatus;
displaying the obtained information about the at least one second client;
determining a second client as a target client from the at least one second client;
receiving a navigation page pushed and generated by the server according to geographical locations of the first client and the target client;
displaying the navigation page on the display panel, the navigation page being a graphical user interface (GUI), comprising:
  setting an operation attribute of a transfer control of the GUI as inoperable when the navigation page is initially displayed by the first client;
  displaying the transfer control on the navigation page as a greyed out control according to the operation attribute being inoperable; and
  displaying, on the navigation page, a real-time location indicator of the first client and a real-time location indicator of the target client;
determining that the first client and the target client are located at a same place upon detecting that the real-time location indicator of the first client and the real-time location indicator of the target client overlap as a visual output on the display panel configuration;
triggering the eWallet of the first client to make an amount transfer of a specified amount to an eWallet of the target client, comprising:
  when the real-time location indicator of the first client and the real-time location indicator of the target client overlap as the visual output on the display panel configuration on the navigation page displayed by the display panel, setting the operation attribute of the transfer control as operable to make the transfer control an operable transfer control;
  detecting, through the touch-sensitive surface covering the display panel, a touch operation on the operable transfer control;
  in response to determining that the first client and the target client are located at the same place and in response to detecting the touch operation on the operable transfer control, generating, by one client of the first client and the target client, a graphic code related to information about the one client;
  scanning, by the other client of the first client and the target client, the graphic code to parse out the information about the one client;
  in response to the information about the one client being parsed out, displaying, by the other client of the first client and the target client, a value transfer page to obtain the specified amount to be transferred in the amount transfer; and
  sending, by the other client of the first client and the target client, the information about the one client and the specified amount to an amount transfer platform to process the amount transfer.

13. The apparatus according to claim 12, wherein providing the exchange request interface and sending the exchange-service request of cash currency to the server according to the exchange request operation that is triggered on the exchange request interface comprises:
displaying an exchange request webpage provided with the exchange request interface, the exchange request webpage comprising a defining condition for defining a candidate second client that provides the cash-currency-exchange service; and
obtaining the defining condition set in the exchange request webpage, generating the defining condition and the current geographical location information of the first client into the exchange-service request according to the exchange request operation that is triggered on the exchange request interface, and sending the exchange-service request to the server.

14. The apparatus according to claim 12, wherein the processor is further configured to perform:
receiving the information about the second client, calculating a distance between the first client and the second client according to the current geographical location information of the second client that is carried in the information about the second client, and binding and displaying the information about the second client and the distance; and
when the information about the second client further includes the distance between the first client and the second client, receiving the information about the second client, and binding and displaying the information about the second client and the distance between the first client and the second client.

15. The apparatus according to claim 12, wherein, after the determining of the second client as the target client from the displayed at least one second client, the processor is further configured to perform:

sending information about the target client to the server, the information about the target client being used to trigger the server to generate the navigation page according to a path between the first client and the target client after receiving the information about the target client and when the target client is a merchant client, and being pushed to at least one of the first client and the target client.

16. The apparatus according to claim 12, wherein the processor is further configured to perform:

receiving location information of an intermediate merchant client pushed by the server, the location information of the intermediate merchant client being information about the intermediate merchant client determined by the server in response to the server receiving the information about the target client selected by the first client and the target client being a user client, and the intermediate merchant client also being a client located closest to the first client and connected to a device capable of verifying authenticity of the cash currency; and generating the navigation page by using a path between the first client and the intermediate merchant client, the generated navigation page displaying the real-time location indicator of the first client, the real-time location indicator of the target client, and the location indicator of the intermediate merchant client.

17. The apparatus according to claim 15, wherein the processor is further configured to perform:

receiving and displaying a navigation page based on information about a location at which an intermediate merchant client is located that is pushed by the server, the navigation page being a navigation page generated, according to a path between the first client and the intermediate merchant client, by the server by determining the intermediate merchant client whose location is closest to a location at which the first client is located after receiving the information about the target client that is selected by the first client and when the target client is a user client, and a merchant corresponding to the intermediate merchant client being capable of verifying authenticity of cash currency.

18. A non-transitory computer-readable storage medium storing computer program instructions executable by at least one processor of a user terminal running a first client requesting a cash-currency-exchange service in a system for supporting cash currency exchange, the system including a plurality of second clients providing the cash-currency-exchange service and a server, the computer program instructions causing the at least one processor to perform:

providing an exchange request interface configured to initiate the cash currency exchange for exchanging currency from an eWallet of the first client to cash, and to provide a condition setting option for the cash currency exchange;

determining a current geographical location of the user terminal;

sending an exchange-service request of cash currency to the server according to an exchange request operation triggered on the exchange request interface, wherein the exchange-service request carries the current geographical location of the user terminal and is used to trigger the server to:

obtain one or more second clients in a preset range from the first client according to at least the current geographical location information of the first client, the preset range being determined based on the condition setting option;

push an exchange-service item corresponding to the exchange-service request to the one or more second clients; and receive a confirmation response of the exchange-service item from at least one second client of the one or more second clients;

receiving information about the at least one second client pushed by the server and a terminal executing the at least one second client being located within the preset range from the user terminal;

displaying the obtained information about the at least one second client;

determining a second client as a target client from the at least one second client;

receiving a navigation page pushed and generated by the server according to geographical locations of the first client and the target client;

displaying the navigation page on a display panel having a display panel configuration comprising a liquid crystal display (LCD) or an organic light-emitting diode (OLED) covered with a touch-sensitive surface, the navigation page being a graphical user interface (GUI), comprising:

setting an operation attribute of a transfer control of the GUI as inoperable when the navigation page is initially displayed by the first client;

displaying the transfer control on the navigation page as a greyed out control according to the operation attribute being inoperable; and displaying, on the navigation page, a real-time location indicator of the first client and a real-time location indicator of the target client;

determining that the first client and the target client are located at a same place upon detecting that the real-time location indicator of the first client and the real-time location indicator of the target client overlap as a visual output on the display panel configuration;

triggering the eWallet of the first client to make an amount transfer of a specified amount to an eWallet of the target client, comprising:

when the real-time location indicator of the first client and the real-time location indicator of the target client overlap as the visual output on the display panel configuration on the navigation page displayed by the display panel, setting the operation attribute of the transfer control as operable to make the transfer control an operable transfer control;

detecting, through the touch-sensitive surface covering the display panel, a touch operation on the operable transfer control;

in response to determining that the first client and the target client are located at the same place and in response to detecting the touch operation on the operable transfer control, generating, by one client of the first client and the target client, a graphic code related to information about the one client;

scanning, by the other client of the first client and the target client, the graphic code to parse out the information about the one client;

in response to the information about the one client being parsed out, displaying, by the other client of the first client and the target client, a value transfer page to obtain the specified amount to be transferred in the amount transfer; and sending, by the other client of the first client and the target client, the information about the one client and the specified amount to an amount transfer platform to process the amount transfer.

* * * * *